(12) United States Patent
Takeo et al.

(10) Patent No.: US 10,956,095 B2
(45) Date of Patent: Mar. 23, 2021

(54) SERVER SYSTEM THAT IMPROVES AVAILABILITY OF A PLURALITY OF PRINTERS, PRINT CONTROLLER, INFORMATION PROCESSING APPARATUS, AND PRINT SERVICE SYSTEM

(71) Applicant: CANON KABUSHIKI KAISHA, Tokyo (JP)

(72) Inventors: Akinori Takeo, Yokohama (JP); Takeshi Kaneda, Funabashi (JP); Masaki Kashiwagi, Hiratsuka (JP); Jun Miyajima, Toride (JP); Seijiro Imai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/565,568

(22) Filed: Sep. 10, 2019

(65) Prior Publication Data
US 2020/0089440 A1 Mar. 19, 2020

(30) Foreign Application Priority Data
Sep. 14, 2018 (JP) .............................. JP2018-172539
Feb. 14, 2019 (JP) .............................. JP2019-024683

(51) Int. Cl.
*G06F 3/12* (2006.01)

(52) U.S. Cl.
CPC ............ *G06F 3/1205* (2013.01); *G06F 3/126* (2013.01); *G06F 3/1226* (2013.01); *G06F 3/1255* (2013.01); *G06F 3/1288* (2013.01)

(58) Field of Classification Search
CPC combination set(s) only.
See application file for complete search history.

(56) References Cited

U.S. PATENT DOCUMENTS

| | | | |
|---|---|---|---|
| 7,852,497 B2 | 12/2010 | Sato | |
| 2009/0201531 A1* | 8/2009 | Pandit | G06F 3/1207 358/1.15 |
| 2010/0245884 A1* | 9/2010 | Komine | G06F 3/1205 358/1.15 |
| 2010/0321716 A1* | 12/2010 | Takeo | G06F 3/1222 358/1.14 |
| 2013/0293924 A1* | 11/2013 | Armstrong | G06F 3/1255 358/1.15 |
| 2019/0107977 A1* | 4/2019 | Yokoohji | G06F 3/1211 |

FOREIGN PATENT DOCUMENTS

JP 2004213111 A 7/2004

\* cited by examiner

*Primary Examiner* — Helen Zong
(74) *Attorney, Agent, or Firm* — Rossi, Kimms & McDowell LLP

(57) ABSTRACT

A server system that causes one of a plurality of printers to print an image received from an information processing apparatus. A virtual printer determines whether or not a printer capable of performing printing to which both of a first print setting and a second print setting are applied is included in the plurality of printers. In a case where it is determined that a printer capable of performing printing to which the first and second print settings are applied is not included in the plurality of printers, information indicating that the first print setting and the second print setting conflicting with each other is stored as prohibited settings information. The print settings are controlled based on the prohibited settings information.

14 Claims, 24 Drawing Sheets

FIG. 6A

```
COLOR: MONOCHROME
FINISHING: NONE
DOUBLE-SIDED: LONG-SIDE BINDING &
SHORT-SIDE BINDING SUPPORTED
SHEET SIZE: A4, LETTER, LEGAL, A3, LEDGER
```

FIG. 6B

```
COLOR: COLOR
FINISHING: NONE
DOUBLE-SIDED: NONE
SHEET SIZE: A4, LETTER, LEGAL
```

FIG. 6C

```
COLOR: COLOR
FINISHING: STAPLING, PUNCHING
DOUBLE-SIDED: LONG-SIDE BINDING &
SHORT-SIDE BINDING SUPPORTED
SHEET SIZE: A4, LETTER, LEGAL
```

```
Internet Printing Protocol
    version: 2.0
    operation-id: Register-Output-Device Request
    request-id: 1
    operation-attributes-tag
        attributes-charset (charset): 'utf-8'
            name: attributes-charset
            charset value: 'utf-8'
        attributes-natural-language (naturalLanguage): 'en-us'
            name: attributes-natural-language
            naturalLanguage value: 'en-us'
        printer-uri (uri): 'ipp://XXXXX.local.:631/ipp/print'
            name: printer-uri                                       ~1011
            uri value: 'ipp://XXXXX.local.:631/ipp/print'
```

```
Internet Printing Protocol
    version: 2.0
    status-code: Successful (successful-ok)                ~1021
    request-id: 1
    operation-attributes-tag
        attributes-charset (charset) 'utf-8'
        attributes-natural-language (naturalLanguage): 'en-us'
```

FIG. 10Ba          1030

```
Internet Printing Protocol
    version: 2.0
    operation-id: Get-Printer-Attributes (0x000b)
    request-id: 2
    operation-attributes-tag
        attributes-charset (charset): 'utf-8'
            name: attributes-charset
            charset value: 'utf-8'
        attributes-natural-language (naturalLanguage): 'en-us'
            name: attributes-natural-language
            naturalLanguage value : 'en-us'
        printer-uri (uri): 'ipp://www.example.com.:631/ipp/print'
            name: printer-uri
            uri value: 'ipp://www.example.com.:631/ipp/print'
        [truncated]requested-attributes:
            name: requested-attributes
1031a──    keyword value: 'color-supported'
1031b──    keyword value: 'finishings-supported'       ──1031
1031c──    keyword value: 'sides-supported'
1031d──    keyword value: 'media-supported'
```

FIG. 10Bb          1040

```
Internet Printing Protocol
    version: 2.0
    status-code: Successful (successful-ok)
    request-id: 2
    operation-attributes-tag
1041a  attributes-charset (charset): 'utf-8'                                         1041
       attributes-natural-language (naturalLanguage): 'en-us'
     printer-attributes-tag
      ─color-supported (boolean): false
      ─finishings-supported (enum): staple, punch
       sides-supported (1setOf keyword): 'one-sided', 'two-sided-long-edge', 'two-sided-short-edge'
       media-supported (1setOf keyword): 'iso_a4_210x297mm', 'na_letter_8.5x11in', 'na_legal_8.5x14in'
                                        , 'iso_a3_297x420mm', 'na_ledger_11x17in'
1041b 1041c 1041d
```

FIG. 10Bc          1050

```
Internet Printing Protocol
    version: 2.0
    status-code: Successful (successful-ok)
    request-id: 2
    operation-attributes-tag
1051a  attributes-charset (charset): 'utf-8'                                         1051
       attributes-natural-language (naturalLanguage): 'en-us'
     printer-attributes-tag
      ── color-supported (boolean): true      ─1051b
       finishings-supported (enum): none ─        ─1051c      1051d
       sides-supported (1setOf keyword): 'one-sided'─
       media-supported (1setOf keyword): 'iso_a4_210x297mm', 'na_letter_8.5x11in', 'na_legal_8.5x14in'
```

FIG. 10Ca 1060

```
Internet Printing Protocol
    version: 2.0
    operation-id: Get-Printer-Attributes (0x000b)
    request-id: 2
    operation-attributes-tag
        attributes-charset (charset): 'utf-8'
            name: attributes-charset
            charset value: 'utf-8'
        attributes-natural-language (naturalLanguage): 'en-us'
            name: attributes-natural-language
            naturalLanguage value: 'en-us'
        attributes-supported (supported): 'and'              ~1061
            name: attributes-supported
            supported value: 'and'
        printer-uri (uri): 'ipp://www.example.com.:631/ipp/print'
            name: printer-uri
            uri value: 'ipp://www.example.com.:631/ipp/print'
        [truncated]requested-attributes:
            name: requested-attributes
            keyword value: 'color-supported'
            keyword value: 'finishings-supported'
            keyword value: 'sides-supported'
            keyword value: 'media-supported'
```

FIG. 10Cb 1070

```
Internet Printing Protocol
    version: 2.0
    status-code: Successful (successful-ok)
    request-id: 2
    operation-attributes-tag
        attributes-charset (charset): 'utf-8'
        attributes-natural-language (naturalLanguage): 'en-us'
1071a   attributes-supported (supported): 'and'              1071
        printer-attributes-tag
            color-supported (boolean): false
            finishings-supported (enum): none
            sides-supported (1setOf keyword): 'one-sided'
            media-supported (1setOf keyword): 'iso_a4_210x297mm', 'na_letter_8.5x11in', 'na_legal_8.5x14in'
```

```
Internet Printing Protocol
    version: 2.0
    operation-id: Get-Printer-Attributes (0x000b)
    request-id: 2
    operation-attributes-tag
        attributes-charset (charset): 'utf-8'
            name: attributes-charset
            charset value: 'utf-8'
        attributes-natural-language (naturalLanguage): 'en-us'
            name: attributes-natural-language
            naturalLanguage value: 'en-us'
        ┌─────────────────────────────────────────────┐
        │ attributes-supported (supported): 'or'      │
        │     name: attributes-supported              │---1081
        │     supported value: 'or'                   │
        └─────────────────────────────────────────────┘
        printer-uri (uri): 'ipp://www.example.com.:631/ipp/print'
            name: printer-uri
            uri value: 'ipp://www.example.com.:631/ipp/print'
        [truncated]requested-attributes:
            name: requested-attributes
            keyword value: 'color-supported'
            keyword value: 'finishings-supported'
            keyword value: 'sides-supported'
            keyword value: 'media-supported'
```

FIG. 10Db            1090

```
Internet Printing Protocol
    version: 2.0
    status-code: Successful (successful-ok)
    request-id: 2
    operation-attributes-tag
        attributes-charset (charset): 'utf-8'
        attributes-natural-language (naturalLanguage): 'en-us'
1091a  attributes-supported (supported): 'or'                                           1091
    printer-attributes-tag
        ┌───────────────────────────────────────────────────────────────────────────┐
        │ color-supported (boolean): true                                           │
        │ finishings-supported (enum): staple, punch                                │
        │ sides-supported (1setOf keyword): 'one-sided', 'two-sided-long-edge', 'two-sided-short-edge' │
        │ media-supported (1setOf keyword): 'iso_a4_210x297mm', 'na_letter_8.5x11in', 'na_legal_8.5x14in' │
        │     , 'iso_a3_297x420mm', 'na_ledger_11x17in'                             │
1091b   └───────────────────────────────────────────────────────────────────────────┘

```
                                                  1092
Internet Printing Protocol
    version: 2.0
    operation-id: Get-Printer-Attributes (0x000b)
    request-id: 2
    operation-attributes-tag
        attributes-charset (charset): 'utf-8'
            name: attributes-charset
            charset value: 'utf-8'
        attributes-natural-language (naturalLanguage): 'en-us'
            name: attributes-natural-language
            naturalLanguage value: 'en-us'
        attributes-supported (supported): 'or'
            name: attributes-supported
            supported value: 'or'
        printer-uri (uri): 'ipp://www.example.com.:631/ipp/print'
            name: printer-uri
            uri value: 'ipp://www.example.com.:631/ipp/print'
        [truncated]requested-attributes:
            name: requested-attributes
            keyword value: 'job-constraints-supported'    ~1093
```

FIG. 10Eb

```
                                                  1094
Internet Printing Protocol
    version: 2.0
    status-code: Successful (successful-ok)
    request-id: 2
    operation-attributes-tag
        attributes-charset (charset): 'utf-8'
        attributes-natural-language (naturalLanguage): 'en-us'
        attributes-supported (supported): 'or'            1095
    printer-attributes-tag
        job-constraints-supported =[
            {
1095a         color={'true'},
              media-col={'iso_a3_297x420mm', 'na_ledger_11x17in'}
            },
            {
1095b         color={'true'},
              finishings={'staple', 'punch'}
            },
        }
```

*FIG. 12*

| | COLOR | SHEET SIZE | DOUBLE-SIDED PRINT |
|---|---|---|---|
| 1201 | Color | A3 | — |
| 1202 | Color | LEDGER | — |
| 1203 | Color | — | LONG-SIDE BINDING |
| 1204 | Color | — | SHORT-SIDE BINDING |

```
Internet Printing Protocol
    version: 2.0
    operation-id: Deregister-Output-Device Request
    request-id: 1
    operation-attributes-tag
        attributes-charset (charset): 'utf-8'
            name: attributes-charset
            charset value: 'utf-8'
        attributes-natural-language (naturalLanguage): 'en-us'
            name: attributes-natural-language
            naturalLanguage value: 'en-us'
        printer-uri (uri): 'ipp://XXXXX.local.:631/ipp/print'
            name: printer-uri                                        ~1711
            uri value: 'ipp://XXXXX.local.:631/ipp/print'
```

```
Internet Printing Protocol
    version: 2.0
    status-code: Successful (successful-ok)                ~1721
    request-id: 1
    operation-attributes-tag
        attributes-charset (charset): 'utf-8'
        attributes-natural-language (naturalLanguage): 'en-us'
```

|  | COLOR | MONOCHROME | A4 | A3 | DOUBLE-SIDED |
|---|---|---|---|---|---|
| COLOR | N/A | ○ | ○ | × | × |
| MONOCHROME | N/A | N/A | ○ | ○ | ○ |
| A4 | N/A | N/A | N/A | ○ | ○ |
| A3 | N/A | N/A | N/A | N/A | × |
| DOUBLE-SIDED | N/A | N/A | N/A | N/A | N/A |

|  | COLOR | MONOCHROME | A4 | A3 | DOUBLE-SIDED | STAPLING | PUNCHING |
|---|---|---|---|---|---|---|---|
| COLOR | N/A | ○ | ○ | × | × |  |  |
| MONOCHROME | N/A | N/A | ○ | ○ | ○ |  |  |
| A4 | N/A | N/A | N/A | ○ | ○ |  |  |
| A3 | N/A | N/A | N/A | N/A | × |  |  |
| DOUBLE-SIDED | N/A | N/A | N/A | N/A | N/A |  |  |
| STAPLING | N/A | N/A | N/A | N/A | N/A | N/A |  |
| PUNCHING | N/A | N/A | N/A | N/A | N/A | N/A | N/A |

|  | COLOR | MONOCHROME | A4 | A3 | DOUBLE-SIDED | STAPLING | PUNCHING |
|---|---|---|---|---|---|---|---|
| COLOR | N/A | ○ | ○ | × | ○ | ○ | ○ |
| MONOCHROME | N/A | N/A | ○ | ○ | ○ | ○ | ○ |
| A4 | N/A | N/A | N/A | ○ | ○ | ○ | ○ |
| A3 | N/A | N/A | N/A | N/A | × | × | × |
| DOUBLE-SIDED | N/A | N/A | N/A | N/A | N/A | ○ | ○ |
| STAPLING | N/A | N/A | N/A | N/A | N/A | N/A | × |
| PUNCHING | N/A | N/A | N/A | N/A | N/A | N/A | N/A |

SERVER SYSTEM THAT IMPROVES AVAILABILITY OF A PLURALITY OF PRINTERS, PRINT CONTROLLER, INFORMATION PROCESSING APPARATUS, AND PRINT SERVICE SYSTEM

BACKGROUND OF THE INVENTION

Field of the Invention

The present invention relates to a server system, a print controller, an information processing apparatus, and a print service system, and more particularly to a server system, a print controller, an information processing apparatus, and a print service system, which improve availability of a plurality of printers.

Description of the Related Art

It is known that an information processing apparatus generates print data to be printed by individual printers by using print drivers (or print applications) designed for the respective printers.

Further, Japanese Laid-Open Patent Publication (Kokai) No. 2004-213111 discloses a method of using a plurality of printers, by regarding them as one virtual printer (group printer), so as to improve availability of the printers. Specifically, a group printer driver installed in an information processing apparatus acquires information on the capabilities of a plurality of printers (member printer drivers), and displays a print settings screen common to the member printer drivers. Further, Japanese Laid-Open Patent Publication (Kokai) No. 2004-213111 discloses a mechanism for checking whether one of the member printer drivers can process a print job based on print settings to be applied to printing, and transmitting the print job.

Incidentally, in recent years, there are an increasing number of cases where print data is generated without using a print driver (or a print application) designed for an individual type of printer. For example, in recent print applications or cloud print services, print data complying with the IPP standard (IPP: Internet Printing Protocol) is generated and transmitted to a printer.

Further, in recent years, a user terminal, such as a smartphone and a PC, is always connected to a network. To cope with such a situation, there are envisaged a mechanism for performing printing via a public network, such as an LTE or 5G network, and a cloud server. For example, there is envisaged a print server system in which print data is transmitted from an information processing apparatus not directly to a printer, but once to a cloud server serving as a print controller, and is stored in the cloud server, whereafter a request is sent from the printer to the cloud server, for pulling the print data stored in the cloud server, and then the print data is printed.

Further, it is possible to envisage using the above-described cloud server as one virtual printer associated with a plurality of printers. In this case, for the sake of convenience of a user, it is envisaged to make use of a logical sum or a logical product of the capabilities of the plurality of printers.

However, in a case where a cloud server is used as a virtual printer having printing capabilities defined by a logical sum of the capabilities of the printers, the following problems may be caused: For example, in the case of checking, based on the logical sum of the capabilities, whether or not printing with print settings is inexecutable by the capabilities of a plurality of printers (hereinafter referred to as conflict check), it is necessary to cause a user to set desired print settings before the conflict check. On the other hand, in a case where the conflict check shows that an invalid setting is included in the print settings desired by the user, the user is required to set print settings again. Further, while the conflict check is being performed, the user is compelled to wait before print data is generated. Any of these problems reduces the convenience of the user.

SUMMARY OF THE INVENTION

The present invention provides a server system, a print controller, an information processing apparatus, and a print service system, which are capable of improving convenience of a user when using a plurality of printers as one virtual printer. Further, the present invention provides a mechanism for advancing the timing of notifying a user that the desired print settings are print settings with which printing is inexecutable when using a plurality of printers as one virtual printer.

In a first aspect of the present invention, there is provided a server system that causes one of a plurality of printers to print an image received from an information processing apparatus, comprising a determination unit configured to determine whether or not a printer capable of performing printing to which both of a first print setting and a second print setting are applied is included in the plurality of printers, and a storage unit configured to store, in a case where it is determined that the printer is not included in the plurality of printers, information indicating that the first print setting and the second print setting conflict with each other, wherein the print settings are controlled based on the stored information.

In a second aspect of the present invention, there is provided a print controller that is capable of communicating with an information processing apparatus and a plurality of printers via a network, and functions as a virtual printer for providing a print service to the information processing apparatus by using the plurality of printers, comprising a registration acquisition unit configured to acquire, from the plurality of printers, capabilities information of the printers, a request unit configured to request each of the plurality of printers to validate whether printing with a combination of print settings is executable thereby based on the acquired capabilities information of the plurality of printers, and a storage unit configured to store, in a case where it is determined based on a response from each of the plurality of printers that processing with the combination of print settings is executable by none of the plurality of printers, the combination of print settings as information indicative of a combination of print settings conflicting with each other between the plurality of printers.

In a third aspect of the present invention, there is provided an information processing apparatus that communicates with a print controller, wherein the print controller is capable of communicating with the information processing apparatus and a plurality of printers via a network, and functions as a virtual printer for providing a print service to the information processing apparatus by using the plurality of printers, the print controller including a registration acquisition unit configured to acquire, from the plurality of printers, capabilities information of the printers, a request unit configured to request each of the plurality of printers to validate whether printing with a combination of print settings is executable thereby based on the acquired capabilities information of the plurality of printers, a storage unit configured to store, in a case where it is determined based on a response from each of the plurality of printers that processing with the combination of print settings is executable by none of the plurality of printers, the combination of print settings as information indicative of a combination of print settings conflicting with each other between the plurality of printers, a second reception unit configured to receive a request from the information processing apparatus, for acquiring the information indicative of a combination of print settings conflicting with each other, and a transmission unit configured to transmit, in a case where the acquisition request is received, the information indicative of a combination of print settings conflicting with each other, stored in the storage unit, to the information processing apparatus, the information processing apparatus comprising an acquisition unit configured to acquire the information indicative of a combination of print settings conflicting with each other in a print service provided by the virtual printer, by transmitting the acquisition request, a display unit configured to display a print settings screen for a user to configure print settings of a print job to be transmitted to the virtual printer, and a restriction unit configured to restrict the combination of print settings conflicting with each other from being set, via the print settings screen, based on the acquired information.

In a fourth aspect of the present invention, there is provided a print service system that includes an information processing apparatus, a print controller, and a plurality of printers, which are capable of communicating with each other via a network, and causes the print controller to function as a virtual printer that provides a print service to the information processing apparatus by using the plurality of printers, comprising a first request unit configured to transmit a registration request from each of the plurality of printers to the print controller when a registration instruction is received from a user, a second request unit configured to register the plurality of printers in the print controller as output destinations in response to the registration request, and transmit, from the print controller, a request for acquiring capabilities information to the printers to be registered, a first response unit configured to transmit the capabilities information from each of the plurality of printers to the print controller as a response to the capabilities information request, a third request unit configured to request each of the plurality of printers from the print controller to validate whether or not printing with a combination of print settings determined based on the capabilities information of the plurality of printers is executable, a second response unit configured to transmit a result of the validation from each of the plurality of printers to the print controller as a response to the validation request, and a storage unit configured to interpret the result of the validation from each of the plurality of printers, and store, in a case where it is determined that printing with the combination of print settings is executable by none of the plurality of printers, the combination of print settings in the print controller as information indicative of a combination of print settings conflicting with each other between the plurality of printers.

According to the present invention, it is possible to improve the convenience of a user when using a plurality of printers as one virtual printer. Further, even when using the plurality of printers as one virtual printer, it is possible to advance the timing of notifying the user that the desired print settings are print settings with which printing is inexecutable.

Further features of the present invention will become apparent from the following description of exemplary embodiments (with reference to the attached drawings).

BRIEF DESCRIPTION OF THE DRAWINGS

FIGS. 6A to 6C are diagrams useful in explaining capabilities of the printers which enable the printers to print with print settings.

FIG. 10Aa is a diagram useful in explaining an example of a message of a registration request transmitted in a step S4002 in FIG. 4.

FIG. 10Ab is a diagram useful in explaining an example of a message of a registration result notification transmitted in a step S4013 in FIG. 4.

FIG. 10Ba is a diagram useful in explaining an example of a message of a capabilities information request transmitted in a step S4003 in FIG. 4.

FIGS. 10Bb and 10Bc are diagrams useful in explaining examples of a message of a capabilities information response transmitted in a step S4004 in FIG. 4.

FIG. 10Ca is a diagram useful in explaining an example of a message of a printer capabilities logical product information request transmitted in a step S5002 in FIG. 5.

FIG. 10Cb is a diagram useful in explaining an example of a message of a printer capabilities logical product information response transmitted in a step S5004 in FIG. 5.

FIG. 10Da is a diagram useful in explaining an example of a message of a printer capabilities logical sum information request transmitted in a step S5006 in FIG. 5.

FIG. 10Db is a diagram useful in explaining an example of a message of a printer capabilities logical sum information response transmitted in a step S5008 in FIG. 5.

FIG. 10Ea is a diagram useful in explaining an example of a message of a printer prohibited settings information request transmitted in a step S5009 in FIG. 5.

FIG. 10Eb is a diagram useful in explaining an example of a message of a printer prohibited settings information response transmitted in a step S5011 in FIG. 5.

FIG. 12 is a diagram showing an example of a prohibited settings information management table registered in a client server in a step S4012 in FIG. 4.

FIG. 17A is a diagram useful in explaining an example of a message of a printer registration deletion request transmitted in a step S1502 in FIG. 15.

FIG. 17B is a diagram useful in explaining an example of a message of a registration deletion result notification transmitted in a step S1512 in FIG. 15.

FIGS. 18A to 18C are tables useful in explaining examples of the prohibited settings information update and storage process in FIG. 14.

DESCRIPTION OF THE EMBODIMENTS

The present invention will now be described in detail below with reference to the accompanying drawings showing embodiments thereof.

Figure 1:
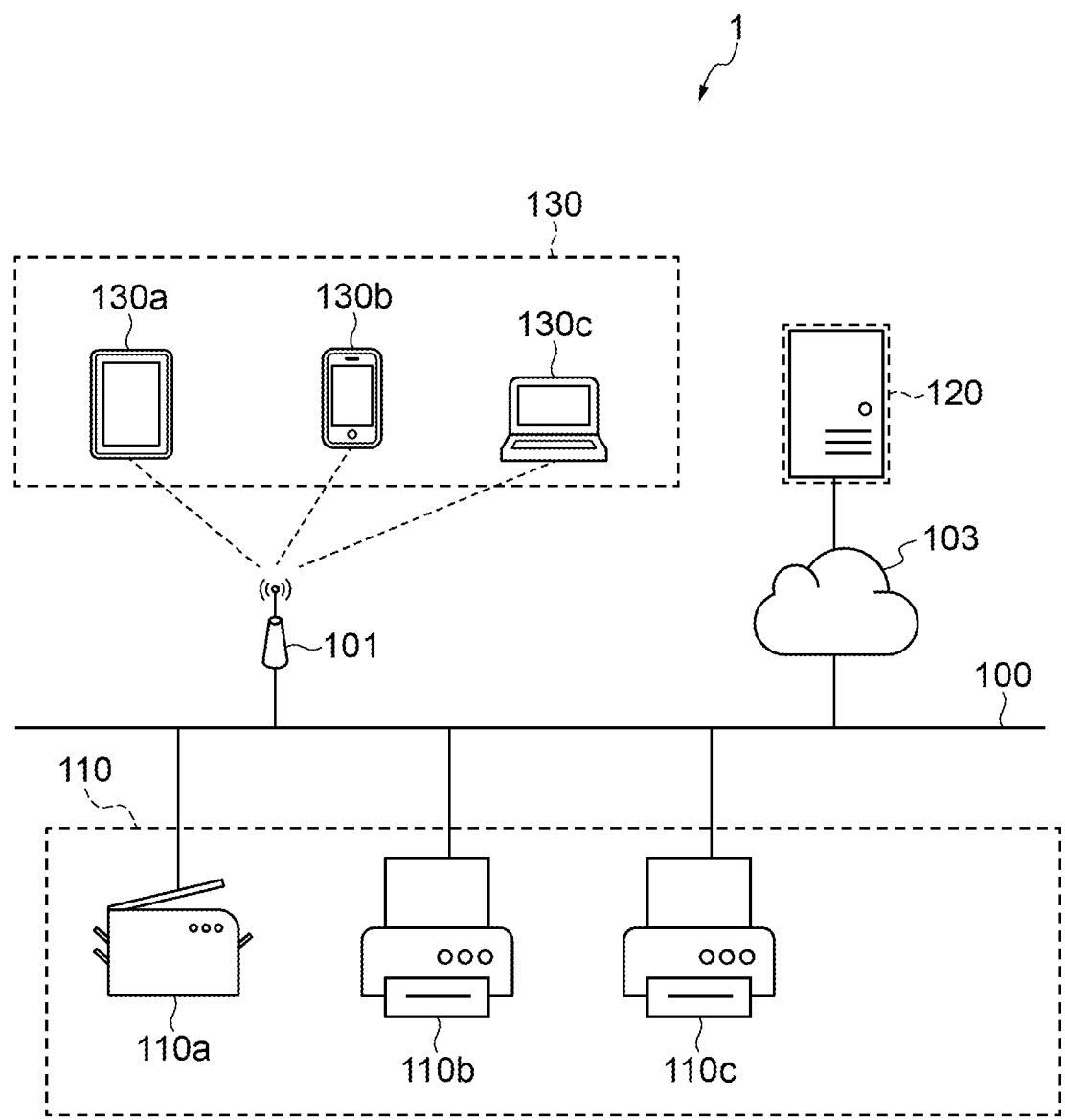
FIG. 1 is a diagram showing the configuration of a print service system according to a first embodiment of the present invention.

FIG. 1 is a diagram useful in explaining the configuration of a print service system according to a first embodiment of the present invention.

Referring to FIG. 1, the print service system, denoted by reference numeral 1, includes printers 110a, 110b, and 110c, a virtual printer (print controller) 120, a tablet 130a, a smartphone 130b, and a PC 130c (hereinafter generically referred to as the information processing apparatus 130).

More specifically, the printers 110a, 110b, and 110c and an AP (access point) 101 are connected to a LAN 100 (Local Area Network) such that they can communicate with each other. Further, the printers 110a, 110b, and 110c, and the information processing apparatuses 130 are capable of communicating with the virtual printer 120 implemented by a cloud server which provides cloud services via the Internet 103.

The printers 110a, 110b, and 110c are different in printer capabilities. In a case where these printers are distinguished from each other hereinafter, the printers are described as the printers 110a, 110b, and 110c, whereas in a case where these printers are not distinguished from each other, the printer(s) is/are described as the printer(s) 110.

Here, the information processing apparatus 130 and the printer 110 can communicate with each other on the LAN 100 via the AP 101.

When a print job request is received from the information processing apparatus 130, the printer 110 performs a printing process.

Although in the present embodiment, as an example of the print service system, the print service system 1 configured as above is described, the present invention is not limited to this. That is, the print service system is only required to have at least one information processing apparatus and at least two printers, which are different in printer capabilities, communicably connected via a network. Further, the network may be either wireless or wired.

In the print service system 1 of the present embodiment, print data is not passed from the information processing apparatus 130 directly to the printer 110, but is once transmitted to the virtual printer 120 via the Internet 103, and stored in the virtual printer 120. Then, the print data stored in the virtual printer 120 is pulled to the printer 110 and is printed.

Next, the printer 110 will be described. The printer 110 has a print function for printing an image on a sheet (recording medium). The printer 110 is capable of executing the printing process based on print data received via a network.

Figure 2A:
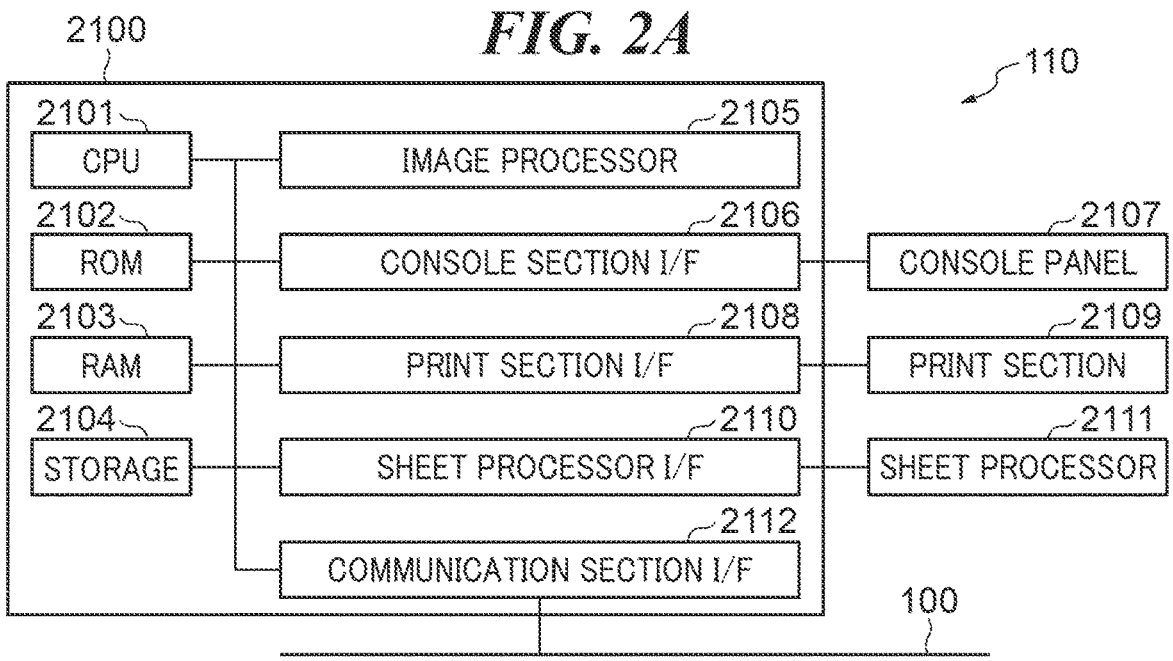
FIGS. 2A to 2C are block diagrams showing respective hardware configurations of a printer, a virtual printer, and an information processing apparatus, appearing in FIG. 1.

FIG. 2A is a block diagram showing a hardware configuration of the printer 110 appearing in FIG. 1. Here, although the printer 110 is described as a printer which has only the print function for printing an image on a sheet, by way of example, the printer 110 may be a printer, such as an MFP (Multi-Function Peripheral), which has not only the print function, but also a scanner function and a FAX function.

Referring to FIG. 2A, the printer 110 includes a controller 2100, a console panel 2107, a print section 2109, and a sheet processor 2111.

The controller 2100 includes a CPU (Central Processing Unit) 2101, a ROM (Read Only Memory) 2102, and a RAM (Random Access Memory) 2103. Further, the controller 2100 includes a storage 2104, an image processor 2105, a console section interface 2106, a print section interface 2108, a sheet processor interface 2110, and a communication section interface 2112, and controls the overall operation of the printer 110.

The CPU 2101 loads programs stored in the ROM 2102 or the storage 2104 into the RAM 2103, and performs various control, such as print control and reading control, by executing the loaded programs.

The ROM 2102 stores control programs which can be executed by the CPU 2101, a boot program, and so forth.

The RAM 2103 is a main storage memory for the CPU 2101 and is used as a work area and a temporary storage area for loading the various control programs.

The storage 2104 stores print data, image data, various programs, and various setting information. Although in the present embodiment, an auxiliary storage device, such as an HDD (Hard Disk Drive), is assumed as the storage 2104, a nonvolatile memory, such as an SSD (Solid State Drive), may be used.

Although in the printer 110 of the print service system 1 according to the present embodiment, the one CPU 2101 executes processes, described hereinafter with reference to illustrated flowcharts, using one memory (the RAM 2103), any other form may be employed. For example, the processes may be executed according to the flowcharts, described hereinafter, by causing a plurality of CPUs, RAMs, ROMs, and storages to operate in cooperation. Further, part of the processes may be executed using a hardware circuit, such as an ASIC (Application Specific Integrated Circuit) or an FPGA (Field-Programmable Gate Array).

The console section interface 2106 connects between the console panel 2107 and the controller 2100. The console panel 2107 is provided with a display section having a touch panel function, various hard keys, and so forth, and functions as a display section for displaying information and a reception section for receiving user instructions.

The print section interface 2108 connects between the print section (printer engine) 2109 and the controller 2100. Image data generated by analyzing a print job received from the information processing apparatus 130 (to be exact, the virtual printer 120, in the case of the present embodiment) is transferred from the controller 2100 to the print section 2109 via the print section interface 2108. The print section 2109 receives a control command and the print job to be printed via the controller 2100, and prints an image on a sheet fed from a sheet feeding cassette (not shown) based on the received print job. Note that the printing method used by the print section 2109 may be either an electrophotographic method or an inkjet method. Further, any other printing method, such as a thermal transfer method, may also be applied.

The communication section interface 2112 is connected to the information processing apparatus 130 via the LAN 100, and further connected to the virtual printer 120 provided by a cloud service via the Internet 103. With this connection, the communication section interface 2112 transmits various information to the virtual printer 120, and receives a print job and the print settings of the received print job from the information processing apparatus 130 on the LAN 100 via the virtual printer 120.

The image processor 2105 has an RIP (Raster Image Processor) function for rasterizing a print job received from the information processing apparatus 130 via the virtual printer 120 provided by the cloud service, to thereby generate image data used for printing. Further, the image processor 2105 is also capable of performing resolution conversion and correction processing on the image data generated by the RIP function. Although in the present embodiment, it is assumed that the image processor 2105 is realized by a hardware circuit (an ASIC, an FPGA, or the like), this is not limitative. For example, the printer 110 may be additionally provided with a processor used for image processing, and the processor may execute image processing programs to thereby realizing the image processing and the processing for conversion into print data. In this case, it is regarded that this processor and the CPU 2102 cooperate to realize the processes, described hereinafter with reference to the flowcharts. Further, the configuration may be such that the CPU 2102 executes the programs for performing image processing, and thereby perform the image processing and conversion into print data. Further, the image processing may be performed by combining the above-mentioned methods.

The sheet processor interface 2110 connects between the controller 2100 and the sheet processor 2111. The sheet processor 2111 receives a control command from the controller 2100, and performs post-processing on a sheet printed by the print section 2109 according to the received control command.

Figure 3A:
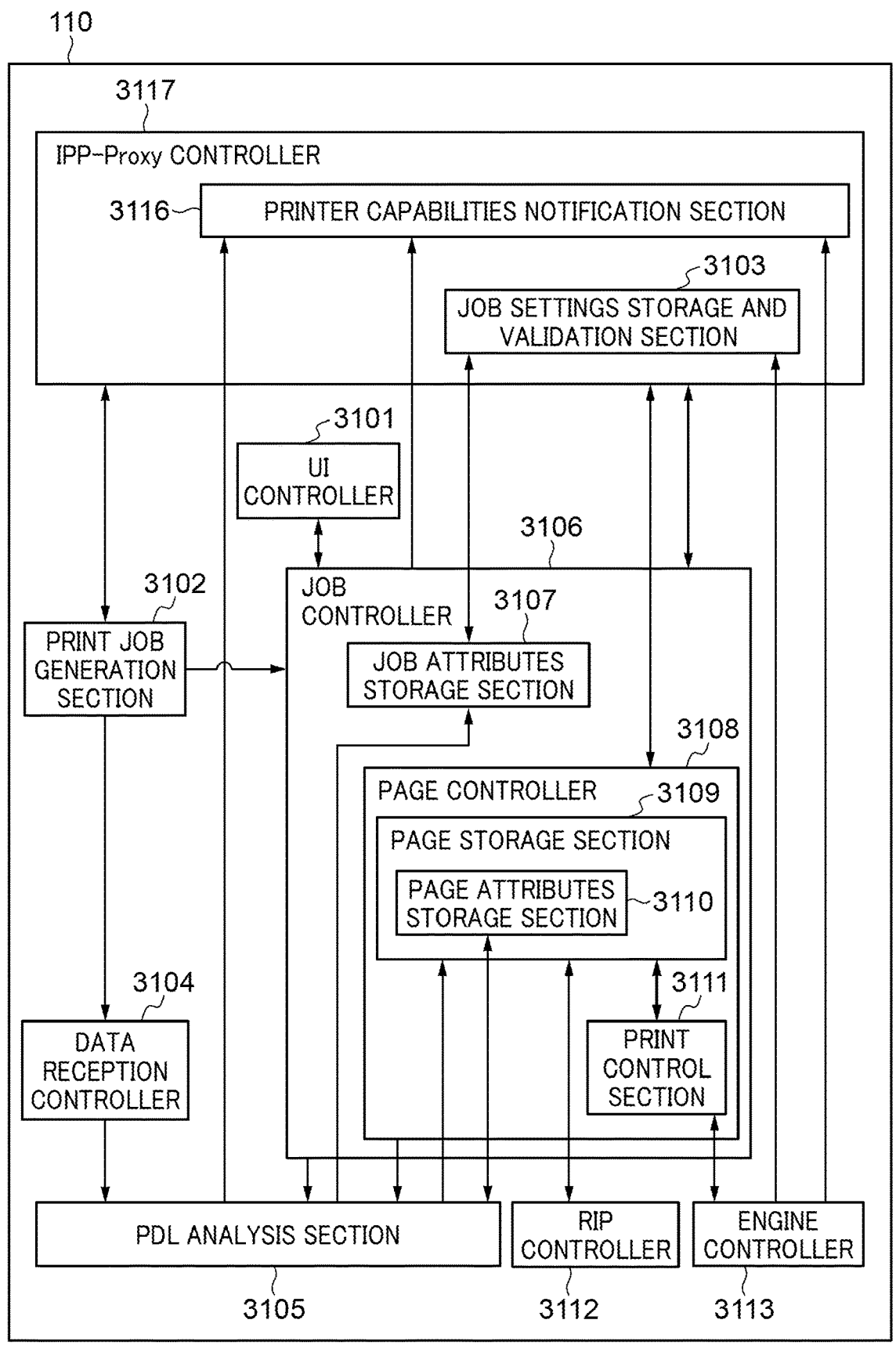
FIG. 3A is a functional block diagram showing a software configuration of the printer.

FIG. 3A is a functional block diagram showing a software configuration of the printer 110. Note that in the present embodiment, the functional blocks associated with the printer 110, shown in FIG. 3A, are realized by the CPU 2101 executing programs loaded into the RAM 2103.

The printer 110 includes a UI controller 3101, a print job generation section 3102, a data reception controller 3104, a PDL analysis section 3105, a job controller 3106, a RIP controller 3112, an engine controller 3113, and an IPP-Proxy controller 3117.

The IPP-Proxy controller 3117 includes a printer capabilities notification section 3116 and a job settings storage and validation section 3103.

The job controller 3106 includes a job attributes storage section 3107, and a page controller 3108 including a page storage section 3109 and a print control section 3111. Further, the page storage section 3109 includes a page attributes storage section 3110.

Upon receipt of an inquiry about the printer capabilities from the virtual printer 120 to the printer 110, the printer capabilities notification section 3116 notifies the virtual printer 120 of information on the printer capabilities of the self-apparatus. This information is comprised of information on supported numbers of copies (copies-supported), supported document formats (document-format-supported), an optimum sheet feeding direction (feed-orientation-supported), and so forth.

Upon acquisition of the information on the printer capabilities from the printer 110, the virtual printer 120 generates a print job adapted to the printer capabilities of the printer 110, and transmits the generated print job to the printer 110. Receipt of the print data of this print job is also performed by the IPP-Proxy controller 3117.

The print job generation section 3102 receives the print job transmitted by the virtual printer 120 from the IPP-Proxy controller 3117 and generates a new job based on rendering data contained in the print job, and transmits the generated new job to the job controller 3106.

The job settings storage and validation section 3103 performs attribute processing for validating job attributes specified by IPP attributes contained in the print job transmitted from the virtual printer 120 and writes a result of the processing into the job attributes storage section 3107. Examples of the processing result to be written include the number of copies to be printed, information on finishing, and PDL format information. The IPP-Proxy controller 3117 transfers the rendering data contained in the print job transmitted from the virtual printer 120 to the data reception controller 3104 via the print job generation section 3102 to temporarily store the same therein, in parallel with the above-mentioned attribute processing performed by the job settings storage and validation section 3103. The data reception controller 3104 is a buffer area for storing rendering data contained in a print job received by the print job generation section 3102, and stores rendering data in the storage 2104 on a print job-by-print job basis.

The PDL analysis section 3105 is compatible with a PWG-Raster format and requests the data reception controller 3104 to send one of items of the rendering data stored in the storage 2104 on a print job-by-print job basis according to an instruction received from the job controller 3106. Then, the PDL analysis section 3105 performs page analysis processing on the item of the rendering data acquired by this request. The page controller 3108 causes the page storage section 3109 and the page attributes storage section 3110 to store image data and page attributes information, respectively, of the page data acquired as a result of the page analysis processing performed by the PDL analysis section 3105.

The page storage section 3109 transmits the stored image data to the RIP controller 3112 according to an instruction from the page controller 3108 and causes the RIP controller 3112 to perform RIP processing. When the rasterized image data is generated, the RIP controller 3112 causes the page storage section 3109 to store the rasterized image data.

The page controller 3108 controls the page analysis processing performed by the PDL analysis section 3105, the RIP processing performed by the RIP controller 3112, and print control processing performed by the print control section 3111. The print control section 3111 acquires the rasterized image data from the page storage section 3109 and transfers the acquired data to the engine controller 3113 after decomposing the same into RGB color components. The engine controller 3113 receives the RGB color components from the print control section 3111 on a page-by-page basis, and controls the print control section 3111 to print each page. The UI controller 3101 acquires information on a status of the print job being executed from the job controller 3106, and displays the processing status of the print job on a UI screen.

Figure 2B:
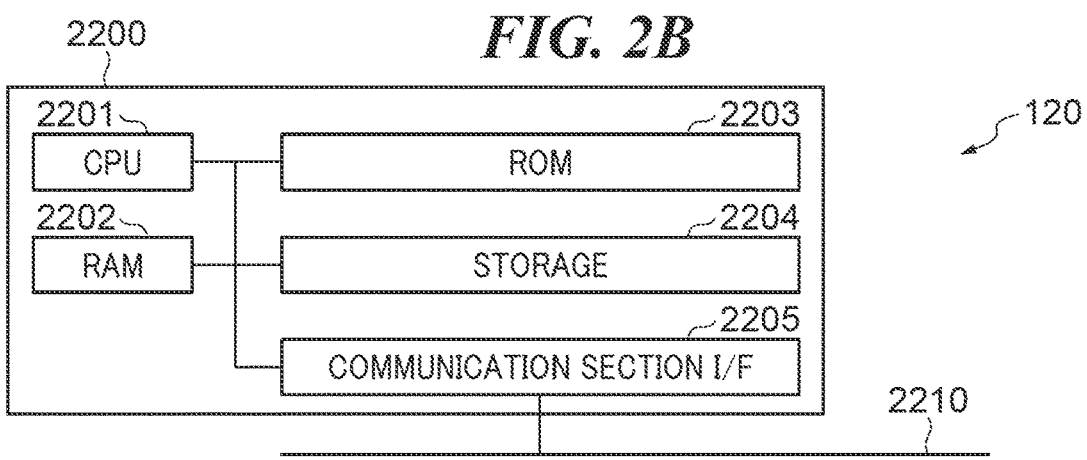

FIG. 2B is a block diagram showing a hardware configuration of the virtual printer 120, appearing in FIG. 1, which provides a cloud printer function as one of the cloud services.

Referring to FIG. 2B, the virtual printer 120 includes a controller 2200 including a CPU 2201, a RAM 2202, a ROM 2203, a storage 2204, and a communication section interface 2205, and the controller 2200 controls the overall operation of the virtual printer 120.

The CPU 2201 loads programs stored in the ROM 2203 or the storage 2204 into the RAM 2202, and performs various control, such as control of generation of print data and control of transfer of a print job, by executing the loaded programs.

The ROM 2203 stores control programs which can be executed by the CPU 2201, a boot program, and so forth.

The RAM 2202 is a main storage memory for the CPU 2201, and is used as a work area and a temporary storage area for loading the various programs.

The storage 2204 stores program data of an OS and a print service, print jobs stored in the cloud, and settings information of various cloud services. Although in the present embodiment, an auxiliary storage device, such as an HDD, is assumed as the storage 2204, a nonvolatile memory, such as an SSD, may be used.

The communication section interface 2205 is connected to the Internet 103 via a LAN 2210, and transmits and receives a print job and information to and from the information processing apparatus 130 and the printer 110 via the LAN 100 connected to the Internet 103 as shown in FIG. 1.

Figure 3B:
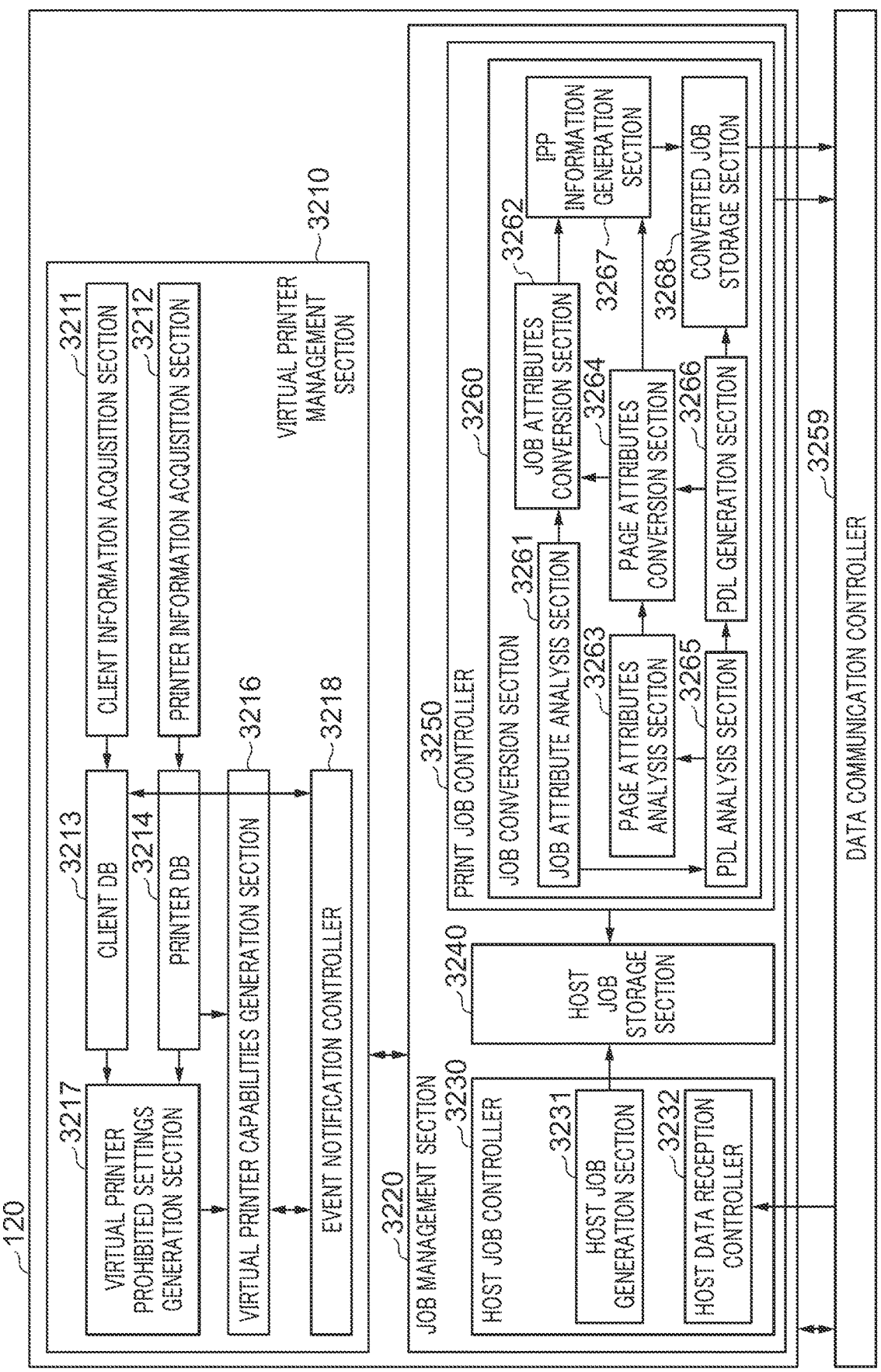
FIG. 3B is a functional block diagram showing a software configuration of the virtual printer.

FIG. 3B is a functional block diagram showing a software configuration of the virtual printer 120. Note that the functional blocks associated with the virtual printer 120, shown in FIG. 3B, are realized by the CPU 2201 executing programs loaded into the RAM 2202.

The virtual printer 120 includes a virtual printer management section 3210, a job management section 3220, and a data communication controller 3259.

The virtual printer management section 3210 includes a client DB 3213, a client information acquisition section 3211, a printer DB 3214, and a printer information acquisition section 3212. Further, the virtual printer management section 3210 includes a virtual printer prohibited settings generation section 3217, a virtual printer capabilities generation section 3216, and an event notification controller 3218.

The client information acquisition section 3211 stores client information received using an IPP protocol in the client DB 3213.

The printer information acquisition section 3212 stores printer information received using the IPP protocol in the printer DB 3214.

The virtual printer prohibited settings generation section 3217 generates information indicative of combinations of print settings conflicting with each other between the printers 110a, 110b, and 110c (hereinafter also referred to as the prohibited settings information). Further, the virtual printer prohibited settings generation section 3217 generates the prohibited settings information of the virtual printer 120 by combining this generated information and the functions supported by the information processing apparatus 130 as the client.

The virtual printer capabilities generation section 3216 generates the capabilities information of the virtual printer by combining not only the respective capabilities information sets of the printers 110a, 110b, and 110c, but also the prohibited settings information generated by the virtual printer prohibited settings generation section 3217.

When the capabilities of the virtual printer are updated or when the status of the printer 110 is changed, the event notification controller 3218 notifies a client of the update of the capabilities or the change of the status.

The virtual printer capabilities generation section 3216 generates the capabilities information of the virtual printer 120 based on the capabilities information of the printers 110, stored in the printer DB 3214, and notifies the information processing apparatus 130 of the generated capabilities information.

In a case where the virtual printer capabilities generation section 3216 reconfigures the capabilities information of the virtual printer 120, the event notification controller 3218 notifies the information processing apparatus 130 of the update of the capabilities information of the virtual printer 120. Upon receipt of the notification, the information processing apparatus 130 requests the virtual printer 120 again to transmit the capabilities information of the virtual printer 120.

The job management section 3220 is comprised of a host job controller 3230, a host job storage section 3240, and a print job controller 3250.

Further, the host job controller 3230 includes a host job generation section 3231 and a host data reception controller 3232, and processes a print job received from the information processing apparatus 130. Further, the print job controller 3250 includes a job conversion section 3260.

The host job generation section 3231 stores a job received from the information processing apparatus 130 using the IPP protocol in cooperation with the host data reception controller 3232, in the host job storing section 3240, after separating the job into IPP print settings information and print data described in PDL (Page Description Language).

The print job controller 3250 prints the stored job using one of the printers 110a, 110b, and 110c, which have already been registered in the virtual printer 120 as output destinations. In doing this, upon receipt of a print job transmission request from the printer 110 using the IPP protocol, the data format of the job stored in the host job storage section 3240 and the data format which can be processed by the printer 110 are compared, and the job conversion section 3260 determines whether or not data format conversion is required.

The job conversion section 3260 includes a job attributes analysis section 3261, a job attributes conversion section 3262, a page attributes analysis section 3263, a page attributes conversion section 3264, a PDL analysis section 3265, a PDL generation section 3266, an IPP information generation section 3267, and a converted job storage section 3268.

If it is determined as a result of the determination performed by the job conversion section 3260 that data format conversion is required, the PDL analysis section 3265 analyzes the page data based on the job attributes and document attributes of the IPP acquired via the job attributes analysis section 3261. After that, the PDL generation section 3266 converts the data format to an image format adapted to the printer 110 having requested the print data. The page attributes of the new image format are generated by combining the page attributes of the original data and the page attributes of the converted data. The page attributes of the original data are acquired by the page attributes analysis section 3263, and the page attributes of the converted data are generated by the page attributes conversion section 3264 by combining the old and new page attributes. Further, the job attributes of the converted data are generated by the job attributes conversion section 3262 combining the old job attributes and the new page attributes. Finally, the IPP information generation section 3267 converts the job attributes and the document attributes to those of the IPP format. Further, the page data converted by the PDL generation section 3266 is stored in the converted job storage section 3268. When all of the job attributes and document attributes of the IPP and the converted PDL data have been prepared in the converted job storing section 3268, the print data is transmitted in response to the print data request received from the printer 110.

Figure 2C:
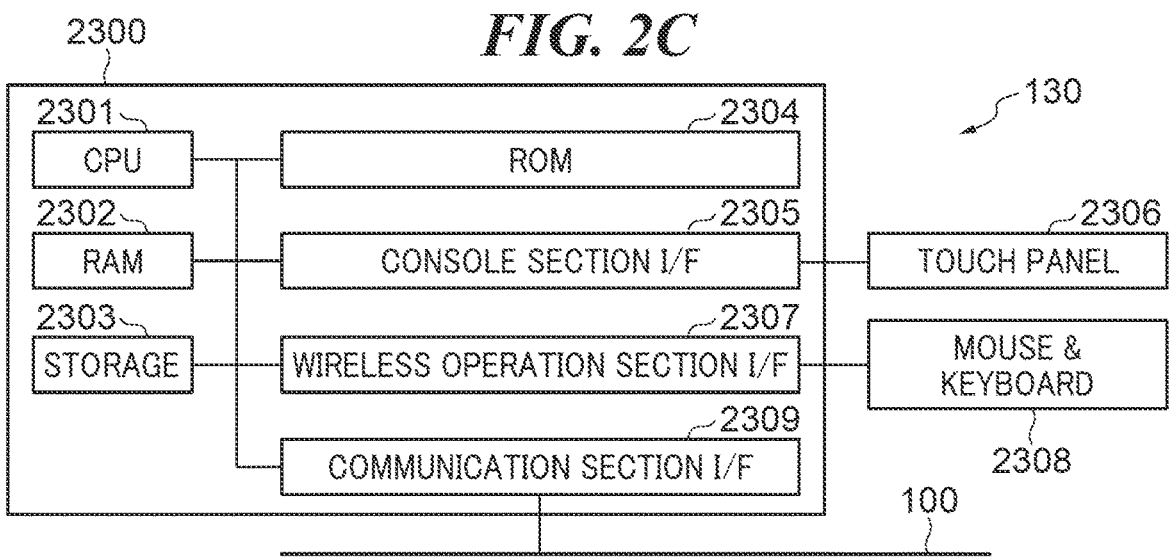

FIG. 2C is a block diagram showing a hardware configuration of the information processing apparatus 130 appearing in FIG. 1.

Referring to FIG. 2C, the information processing apparatus 130 includes a controller 2300, a touch panel 2306, and a mouse and keyboard 2308.

The controller 2300 includes a CPU 2301, a RAM 2302, a storage 2303, a ROM 2304, a console section interface 2305, a wireless operation section interface 2307, and a communication section interface 2309, and controls the overall operation of the information processing apparatus 130.

The CPU 2301 loads programs stored in the ROM 2304 or the storage 2303 into the RAM 2302, and performs various control, such as control of a print settings screen, control of generation of print data, and control of transfer of a print job, by executing the loaded programs.

The ROM 2304 stores control programs which can be executed by the CPU 2301, a boot program, and so forth.

The RAM 2302 is a main storage memory for the CPU 2301, and is used as a work area and a temporary storage area for loading the various control programs.

The storage 2303 stores program data of an OS, data of a print application, an OS print frame work, a print job generated by the OS print frame work, and various setting information. Although in the present embodiment, an auxiliary storage device, such as an HDD, is assumed as the storage 2303, a nonvolatile memory, such as an SSD, may be used.

The touch panel 2306 is connected to the console section interface 2305, and is configured not only to display a screen for each application and the print settings screen, but also to notify an application operating on the CPU 2301 of a user touch operation.

The mouse and keyboard 2308 is connected to the wireless operation section interface 2307 implemented e.g. by Bluetooth (registered trademark), and notifies an application operating on the CPU 2301 of a user operation.

The communication section interface 2309 is connected to the printer 110 via the LAN 100 and is further connected to the virtual printer 120 via the Internet 103. With this connection, the communication section interface 2309 transmits and receives image data and information to and from the printer 110 and the virtual printer 120.

Figure 3C:
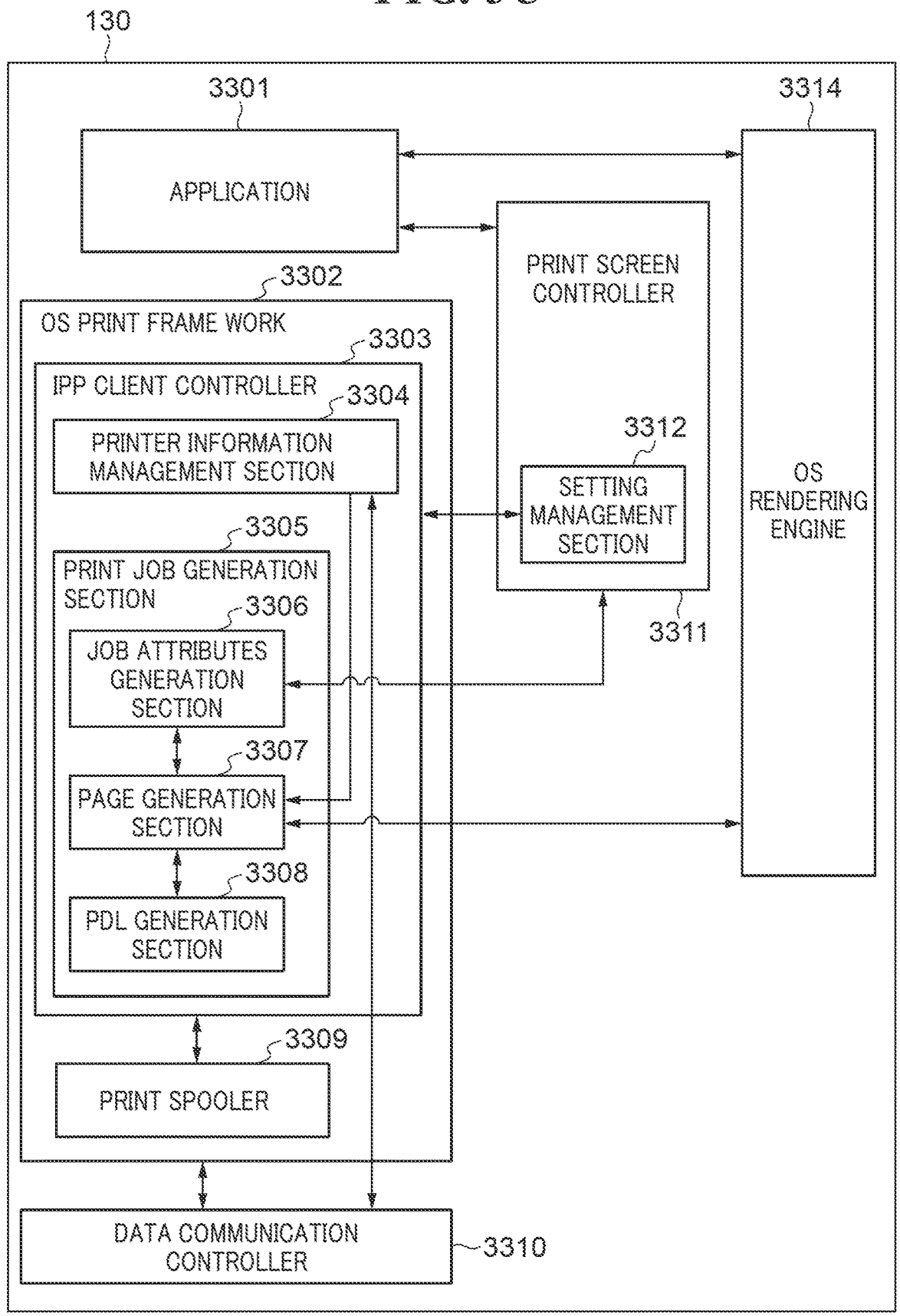
FIG. 3C is a functional block diagram showing a software configuration of the information processing apparatus.

FIG. 3C is a functional block diagram showing a software configuration of the information processing apparatus 130. Note that the functional blocks associated with the information processing apparatus 130, shown in FIG. 3C, are realized by the CPU 2301 executing programs loaded into the RAM 2302.

The information processing apparatus 130 includes an application 3301, an OS print frame work 3302, a data communication controller 3310, a print screen controller 3311, and an OS rendering engine 3314.

The application 3301 is an application installed on the information processing apparatus 130 as desired by a user, which is any of general applications, such as a word processor, a spreadsheet application, a database, a mail application, and a web browser.

The OS print frame work 3302 is comprised of an IPP client controller 3303 and a print spooler 3309. Further, the IPP client controller 3303 is comprised of a printer information management section 3304 and a print job generation section 3305.

The printer information management section 3304 transmits an inquiry to the virtual printer 120 via the data communication controller 3310, and acquires and stores the capabilities information of the virtual printer 120. Examples of the acquired information include not only the above-mentioned information on supported numbers of copies, but also information on the finishing capability of the printer 110, an optimum orientation of a generated image (feed-orientation-supported), and so forth, and the print job generation section 3305 refers to these information items.

The print screen controller 3311 displays the print settings screen in response to a call from the application 3301. The user configures the print settings on the print settings screen, and performs printing. The items of the print settings displayed on the print settings screen are set within a range of print settings which can be provided based on the capabilities information of the virtual printer 120. Print settings to be applied to a print job are temporarily stored in a setting management section 3312 included in the print screen controller 3311.

The print job generation section 3305 is comprised of a job attributes generation section 3306, a page generation section 3307, and a PDL generation section 3308, and generates a print job according to an instruction received from the print screen controller 3311.

The job attributes generation section 3306 generates job attributes and document attributes of an IPP job based on the items of the print settings configured on the print settings screen.

The page generation section 3307 cooperates with the PDL generation section 3308 to convert rendering data generated by the application 3301 through the OS rendering engine 3314 to PDL data supported by the virtual printer 120, and transmits the PDL data to the virtual printer 120. In doing this, the PDL format supported by the virtual printer 120 and an orientation of an image are acquired from the printer information management section 3304, and the data is generated according to the specified PDL format and image orientation.

The OS rendering engine 3314 renders print page data in the rendering format of the OS standard according to a request from the application 3301, and passes the rendered data to the page generation section 3307 of the OS print frame work 3302.

The data communication controller 3310 transmits and receives communication for managing the printer and messages for job transmission and job management, which are generated by the IPP client controller 3303, to and from the virtual printer 120. For example, in a case where the printer 110 registered in the virtual printer 120 supports only the PWG-Raster format, the support format notified from the virtual printer 120 to the information processing apparatus 130 is PWG-Raster. Therefore, in this case, the PDL generation section 3308 generates PWG-Raster format data by optimizing the orientation of the image to an orientation designated by the virtual printer 120.

Figure 4:
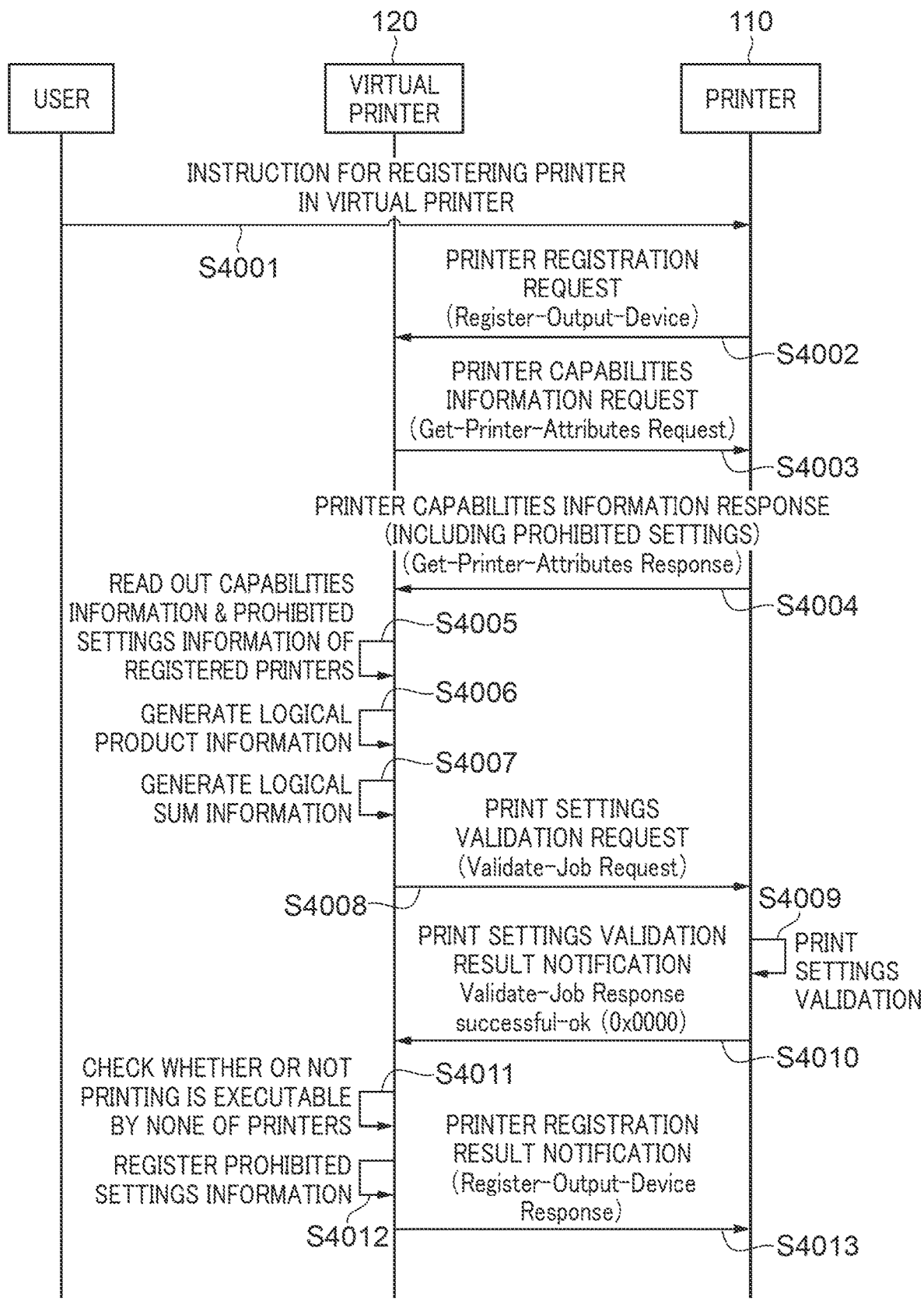
FIG. 4 is a sequence diagram of operations performed between the virtual printer and the printer of the print service system according to the first embodiment, when a user registers the printer in the virtual printer.

FIG. 4 is a sequence of operations performed between the virtual printer 120 and the printer 110 when the printer 110 is registered in the virtual printer 120 of the print service system 1 according to the first embodiment. The following description is given of a case where the capabilities information of the printer 110a is registered in the virtual printer 120 by executing the present process in a state in which the respective capabilities information sets of the printers 110b and 110c have already been registered in the virtual printer 120 before starting the present process, by way of example.

Referring to FIG. 4, first, in a step S4001, upon receipt of an instruction for registering the printer 110a in the virtual printer 120 from a user via the console panel 2107, the printer 110a proceeds to a step S4002.

In the step S4002, the printer 110a transmits a printer registration request (Register-Output-Device) to the virtual printer 120 by IPP communication.

In a step S4003, the virtual printer 120 transmits a capabilities information request (Get-Printer-Attributes Request) to the printer 110a by IPP communication.

In a step S4004, the printer 110a transmits the capabilities information of the printer 110a (Get-Printer-Attributes Response) to the virtual printer 120 by IPP communication in response to the capabilities information request from the virtual printer 120.

In a step S4005, the virtual printer 120 registers the capabilities information transmitted from the printer 110a in the step S4004 in a state associated with the printer 110a as a registered printer. After that, the virtual printer 120 reads out the respective capabilities information sets of the printers 110b and 110c already registered in the virtual printer 120 before starting the present process and prohibited settings information indicative of combinations of print settings with which printing by each of the printers 110b and 110c is inexecutable.

In a step S4006, the virtual printer 120 generates and stores logical product information indicative of capabilities which all the printers registered in the virtual printer 120 have for processing. More specifically, this logical product information is generated from the capabilities information of the printer 110a, which was received in the step S4004, and the capabilities information sets of the printers 110b and 110c, which were read in the step S4005.

In a step S4007, the virtual printer 120 generates and stores logical sum information indicative of capabilities which any one of the printers registered in the virtual printer 120 have for processing. Similar to the logical product information, more specifically, from the capabilities information of the printer 110a, which was received in the step S4004, and the capabilities information sets of the printers 110b and 110c, which were read in the step S4005, this logical sum information is generated. Further, the virtual printer 120 generates combinations of print settings, from the generated logical sum information, on each of which validation is to be performed in the following step S4008 et seq., for validating whether printing with the combination of print settings is executable by any one of the printers registered in the virtual printer 120.

In the step S4008, the virtual printer 120 transmits a validation request to all of the registered printers by IPP communication, for requesting each of them to validate each of the combinations of print settings generated in the step S4007 as to whether printing with the combination of print settings is executable by the printer (Validate-Job Request). That is, this validation request is transmitted to all of the printer 110a, which is newly registered, and the printers 110b and 110c, which have already been registered.

In a step S4009, the printer 110a validates each combination of print settings as to whether or not printing with the combination of print settings is executable by the printer 110a, in response to the request for validation (Validate-Job Request) received from the virtual printer 120 in the step S4008. Note that although not shown in FIG. 4, the printers 110b and 110c each also validate each combination of print settings as to whether or not printing with the combination of print settings is executable thereby, in response to the validation request transmitted from the virtual printer 120 in the step S4008.

In a step S4010, the printer 110a transmits a result of the validation (Validate-Job Response) by IPP communication as a response to the print settings validation request received in the step S4008. Note that as described in the step S4009, the printers 110b and 110c also perform the same validation in response to the print settings validation request transmitted in the step S4008, and hence although not shown in FIG. 4, the validation results are also transmitted from the printers 110b and 110c.

In a step S4011, the virtual printer 120 determines, based on the validation results received from the printers 110a, 110b, and 110c in the step S4010, whether or not it is required to update the prohibited settings information read in the step S4005. That is, the virtual printer 120 checks whether or not the prohibited settings information read in the step S4005 is information indicative of combinations of print settings with which printing is inexecutable even by the printer 110a which is newly registered.

If it is determined in the step S4011 that it is required to update the prohibited settings information, in a step S4012, the virtual printer 120 updates and stores the prohibited settings information.

In a step S4013, the virtual printer 120 notifies the printer 110a of a result of registration of the printer 110a (Register-Output-Device Response) by IPP communication. The printer 110a notifies the user that the printer 110a has been registered in the virtual printer 120 by displaying the notified contents on the console panel 2107. After that, the present process is terminated.

Next, with reference to FIG. 5, a description will be given of a sequence of operations performed between the information processing apparatus 130, the virtual printer 120, and the printer 110, when a printing process is performed by transmitting a print job from the information processing apparatus 130 to the virtual printer 120 for printing.

Figure 5:
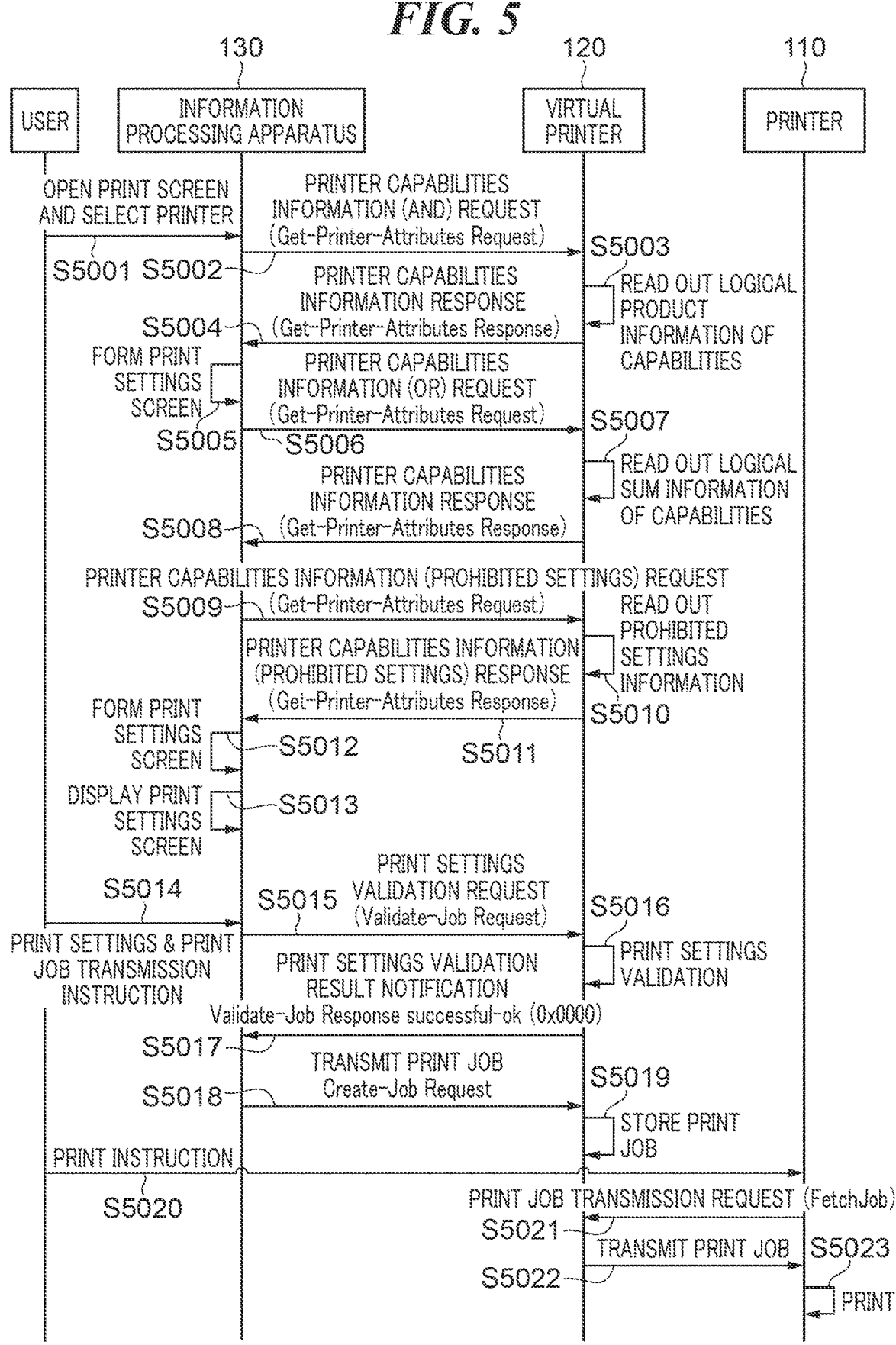
FIG. 5 is a sequence diagram of operations performed between the information processing apparatus, the virtual printer, and the printer, in a case where a print job is transmitted from the information processing apparatus to the virtual printer to print the print job.

Referring to FIG. 5, first, in a step S5001, when a user of the information processing apparatus 130 starts the application 3301 and presses a printer selection button on the print screen opened on the touch panel 2306, the information processing apparatus 130 proceeds to a step S5002.

In the step S5002, the information processing apparatus 130 transmits a request (Get-Printer-Attributes Request) to the virtual printer 120 by IPP communication, for requesting the virtual printer 120 to transmit the logical product information of the capabilities (the AND capabilities) of the printers 110.

Then, in a step S5003, the virtual printer 120 reads out the logical product information of the capabilities of all the printers registered in the virtual printer 120, which was generated and stored in the step S4006 in FIG. 4.

In a step S5004, the virtual printer 120 transmits the logical product information read in the step S5003 to the information processing apparatus 130 by IPP communication as a response (Get-Printer-Attributes Response) to the request received in the step S5002.

In a step S5005, the information processing apparatus 130 forms a print settings screen in the RAM 2302, which is adapted to the logical product information transmitted from the virtual printer 120 in the step S5004.

In a step S5006, the information processing apparatus 130 transmits a request (Get-Printer-Attributes Request) to the virtual printer 120 by IPP communication, for requesting the virtual printer 120 to transmit the logical sum information of the capabilities (the OR capabilities) of the printers 110.

In a step S5007, the virtual printer 120 reads out the logical sum information of the capabilities of all the printers registered in the virtual printer 120, which was generated and stored in the step S4007 in FIG. 4.

In a step S5008, the virtual printer 120 transmits the logical sum information read in the step S5007 to the information processing apparatus 130 by IPP communication as a response (Get-Printer-Attributes Response) to the request received in the step S5006.

In a step S5009, the information processing apparatus 130 transmits a request (Get-Printer-Attributes Request) to the virtual printer 120 by IPP communication, for requesting the virtual printer 120 to transmit the prohibited settings information of the printers 110.

In a step S5010, the virtual printer 120 reads out the prohibited settings information, which was updated and stored in the step S4012 in FIG. 4.

In a step S5011, the virtual printer 120 transmits the prohibited settings information read in the step S5010 to the information processing apparatus 130 by IPP communication as a response (Get-Printer-Attributes Response) to the request received in the step S5009.

In a step S5012, the information processing apparatus 130 forms a print settings screen in the RAM 2302, which is adapted to the logical sum information transmitted from the virtual printer 120 in the step S5008. More specifically, the print settings screen formed in the step S5005 is updated based on the prohibited settings information received in the step S5011 such that the user is made incapable of setting the combinations of print settings with which printing is executable by none of the printers registered in virtual printer 120.

In a step S5013, the information processing apparatus 130 displays the print settings screen formed in the step S5012 on the touch panel 2306.

In a step S5014, when the user operates the touch panel 2306 or the mouse and keyboard 2308 to set the print settings and instruct the start of printing for a print job on the print settings screen displayed in the step S5013, the information processing apparatus 130 proceeds to a step S5015. Note that the print job to be printed with the print settings set in this step is input to the information processing apparatus 130 by the user either in the step S5001 or in the step S5014.

In the step S5015, the information processing apparatus 130 generates a print job with the print settings set in the step S5014, and then transmits a request (Validate-Job Request) to the virtual printer 120 by IPP communication, for requesting the virtual printer 120 to validate whether or not printing is executable with the set print settings.

In a step S5016, the virtual printer 120 validates whether or not printing with the print settings set in the step S5014 is executable by any one of the printers registered in the virtual printer 120, in response to the validation request received from the information processing apparatus 130. The validation includes confirming whether no prohibited settings are included in the print settings.

In a step S5017, the virtual printer 120 transmits a validation result (Validate-Job Response) to the information processing apparatus 130 by IPP communication as a response to the print settings validation request received in the step S5015.

In a step S5018, the information processing apparatus 130 determines whether or not a validation result indicating that printing with the print settings set in the step S5014 is executable has been received from the virtual printer 120. If the validation result indicates that printing is executable, the information processing apparatus 130 transmits a print job (Create-Job Request) generated with the print settings in the step S5015 to the virtual printer 120 by IPP communication.

In a step S5019, upon receipt of the print job (Create-Job Request) from the information processing apparatus 130, the virtual printer 120 stores the received print job in the storage 2204 of the virtual printer 120.

In a step S5020, the printer 110 receives a print instruction from the user. For example, the printer 110 receives a print instruction for the print job associated with the user by prompting the user to input an ID and a user name from the console panel 2107. Note that the method of receiving a print instruction is not limited to this. Login of a user into the printer so as to use the printer 110 may be used as a trigger, whereby a print instruction for a print job associated with the user may be issued.

In a step S5021, the printer 110 transmits a request (Fetch-Job) to the virtual printer 120 by IPP communication, for requesting the virtual printer 120 to transmit the print job corresponding to the print instruction received in the step S5020.

In a step S5022, the virtual printer 120 transmits the print job stored in the step S5019 to the printer 110 by IPP communication as a response to the print job transmission request (Fetch-Job) received from the printer 110. Here, it is assumed that the print job associated with the user is transmitted to the printer 110.

In a step S5023, the printer 110 receives the print job transmitted from the virtual printer 120, and executes the printing process, followed by terminating the present process.

FIGS. 6A to 6C are diagrams useful in explaining the capabilities of the printers 110a, 110b, and 110c. Hereafter, the wording of "support" is used as the wording indicating that printing with print settings is executable.

FIG. 6A shows the capabilities of the printer 110a, i.e. the print settings with which the printer 110a can execute printing. More specifically, the printer 110a supports monochrome as a color setting, no finishing settings, long-side binding and short-side binding as double-sided print settings, and A4, LETTER, LEGAL, A3, and LEDGER as sheet size settings.

FIG. 6B shows the capabilities of the printer 110b, i.e. the print settings with which the printer 110b can execute printing. More specifically, the printer 110b supports color as a color setting, no finishing settings, no double-sided print settings, and A4, LETTER, and LEGAL as sheet size settings.

FIG. 6C shows the capabilities of the printer 110c, i.e. the print settings with which the printer 110c can execute printing. More specifically, the printer 110c supports color as a color setting, stapling and punching as finishing settings, long-side binding and short-side binding as double-sided print settings, and A4, LETTER, and LEGAL as sheet size settings.

Note that FIGS. 6A to 6C show examples of information of the capabilities of the printers 110, and the capabilities information may include not only the above, but also an automatic double-sided print setting, print resolution settings, and Nin1 layout settings and image rotation settings set on the printer 110-side, and so forth.

Figure 7:
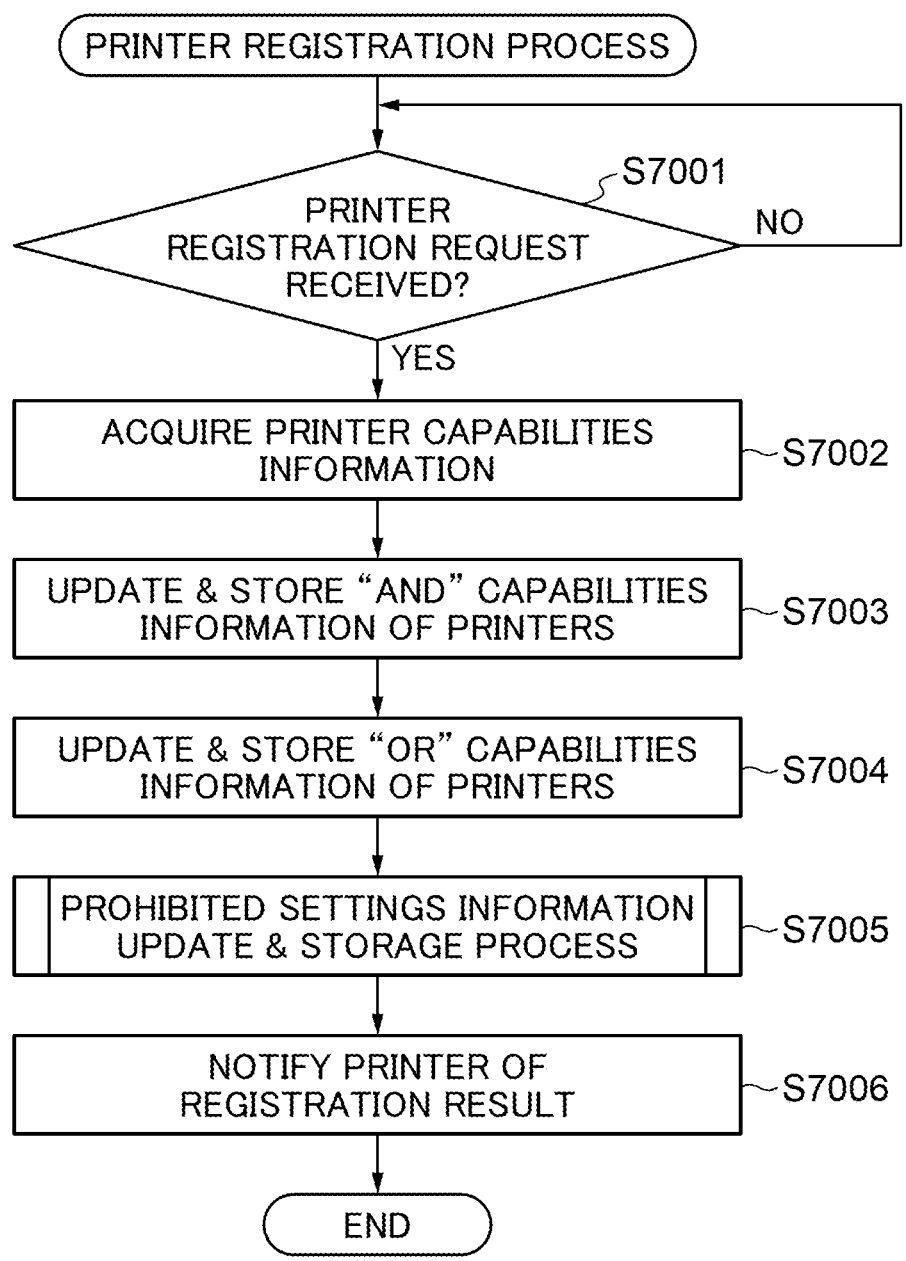
FIG. 7 is a flowchart of a printer registration process performed by the virtual printer of the print service system according to the first embodiment.

Next, a description will be given of a printer registration process according to the present embodiment with reference to FIG. 7, from the step in which the virtual printer 120 receives a registration request from the printer 110a (step S4002) to the step in which a registration result is notified to the printer 110a (step S4013) in the registration process in FIG. 4. The process in FIG. 7 is controlled and executed by the CPU 2201 of the virtual printer 120.

In a step S7001, when a printer registration request is received from the printer 110a, the CPU 2201 proceeds to a step S7002, wherein the CPU 2201 transmits a capabilities information request to the printer 110a and acquires the capabilities information from the printer 110a as a response to the request. Further, the CPU 2201 newly registers the acquired capabilities information of the printer 110a in the virtual printer 120 and stores the same in the storage 2204.

In a step S7003, the CPU 2201 updates the logical product information of the capabilities (the AND capabilities) of the printers 110 which have already been registered in the virtual printer 120 and stores the updated logical product information in the storage 2204.

In a step S7004, the CPU 2201 updates the logical sum information of the capabilities (the OR capabilities) of the printers 110 which have already been registered in the virtual printer 120 and stores the updated logical sum information in the storage 2204.

In a step S7005, the CPU 2201 performs a prohibited settings information update and storage process for updating the prohibited settings information of the printers 110 registered in the virtual printer 120 and storing the updated prohibited settings information in the storage 2204. Details of this process will be described hereinafter with reference to FIG. 8.

In a step S7006, the CPU 2201 notifies the printer 110a of a result of registration of the printer 110a, followed by terminating the present process.

Figure 8:
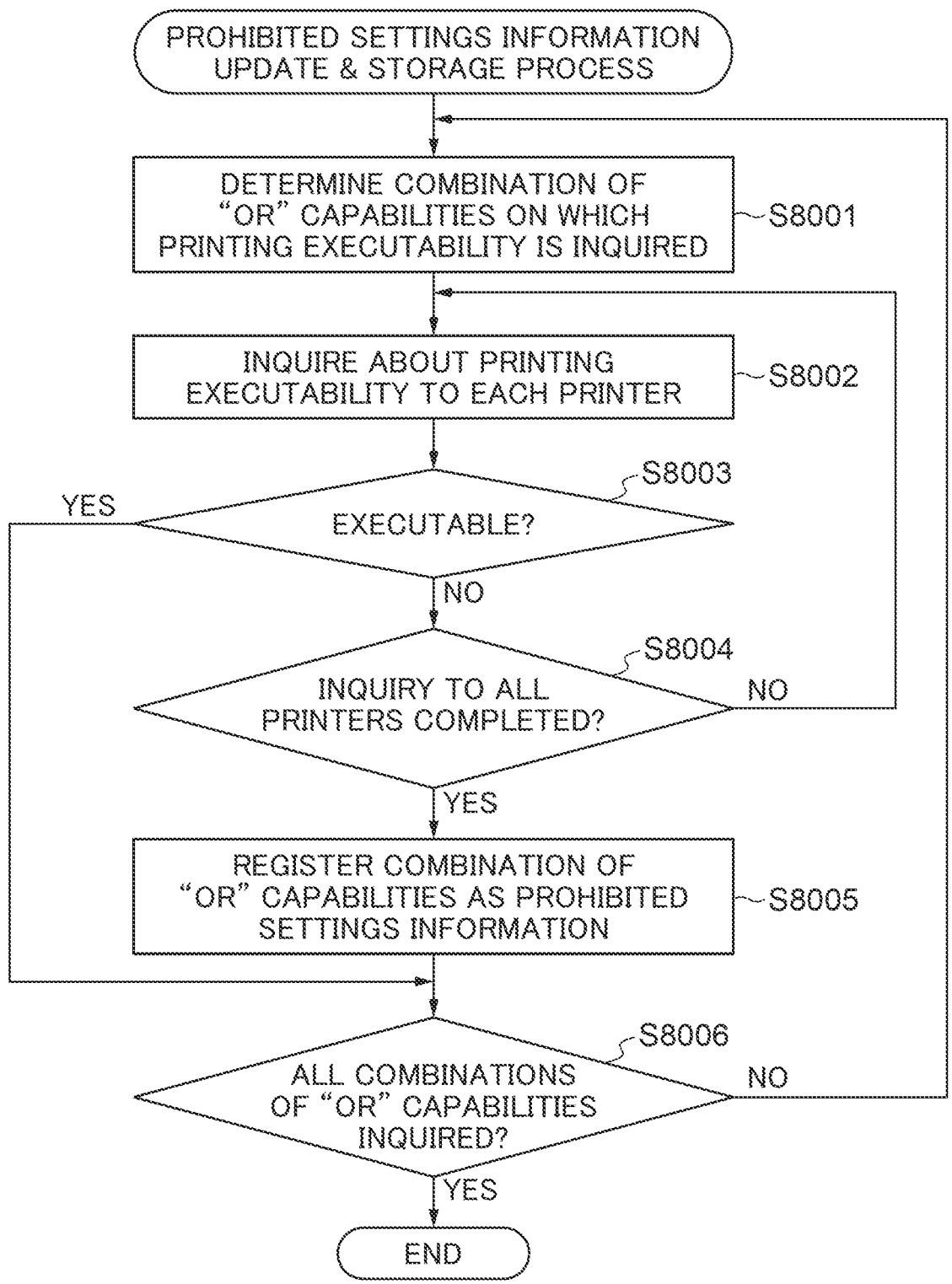
FIG. 8 is a flowchart of a prohibited settings information update and storage process performed by the virtual printer of the print service system according to the first embodiment.

Next, the prohibited settings information update and storage process according to the first embodiment, executed in the step S7005, will be described with reference to FIG. 8. The process in FIG. 8 is controlled and executed by the CPU 2201 of the virtual printer 120.

In a step S8001, the CPU 2201 determines a combination of print settings, about which each printer 110 registered in the virtual printer 120 is to be inquired whether printing is executable therewith in a step S8002 (validation request). This determination is performed based on the logical sum information of the capabilities (the OR capabilities) of the printers 110 registered in the virtual printer 120, which was updated in the step S7004.

In the step S8002, the CPU 2201 transmits a validation request for requesting validation of whether or not printing with the combination of print settings determined in the step S8001 is executable by the printer 110 to one of the printers 110 already registered in the virtual printer 120 (the printer 110a is assumed here).

In a step S8003, upon receipt of a result of the validation from the printer 110a as a response to the validation request transmitted in the step S8002, the CPU 2201 interprets the received validation result. Then, the CPU 2201 determines, based on a result of the interpretation, whether or not printing with the combination of print settings determined in the step S8001 is executable by the printer 110a. If it is determined that printing is executable, the CPU 2201 proceeds to a step S8006, whereas if it is determined that printing is inexecutable, the CPU 2201 proceeds to a step S8004.

In the step S8004, the CPU 2201 determines whether or not transmission of the validation request in the step S8002 is completed for all of the printers 110 registered in the virtual printer 120. If it is determined that transmission of the validation request is completed, the CPU 2201 proceeds to a step S8005. If it is determined that transmission of the validation request is not completed, the CPU 2201 returns to the step S8002, and transmits the validation request to one of the printers 110 registered in the virtual printer 120, to which the validation request has not been transmitted yet.

In the step S8005, it is determined that printing with the combination of print settings (OR capabilities) determined in the step S8001 is executable by none of the printers 110 registered in the virtual printer 120. Then, the CPU 2201 stores and registers the combination of print settings in the storage 2204 as prohibited settings information associated with a job to be input to the virtual printer 120.

In the step S8006, the CPU 2201 determines whether or not transmission of the validation request is completed for all of the combinations of print settings (the OR capabilities) which can be determined based on the logical sum information of the capabilities. If it is determined that transmission of the validation request is completed for all of the combinations of print settings, the present process is terminated. If it is determined that transmission of the validation request is not completed for all of the combinations of print settings, the CPU 2201 returns to the step S8001, and determines, out of all combinations of print settings, which can be determined based on the logical sum information of the capabilities, one combination of print settings for which the validation request has not been transmitted yet, as one for which the validation request is to be made.

Figure 9:
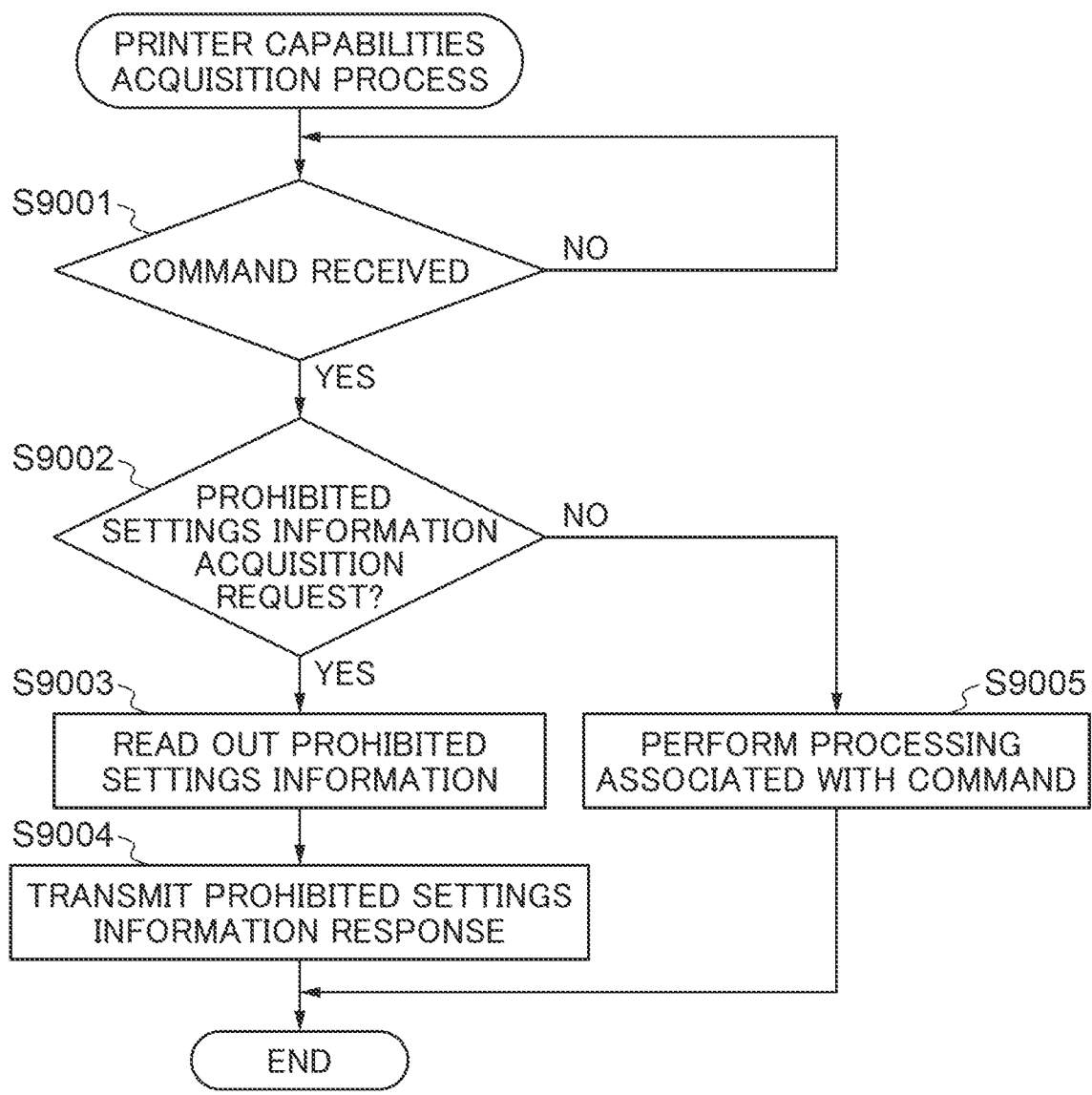
FIG. 9 is a flowchart of a printer capabilities acquisition process performed in steps S5002 to S5006 in FIG. 5.

Next, with reference to FIG. 9, a description will be given of a printer capabilities acquisition process from the step in which the virtual printer 120 receives a request for transmitting the prohibited settings information of the printers 110 from the information processing apparatus 130 (step S5009) to the step in which the virtual printer 120 transmits a response to the request (step S5011) in the printing process in FIG. 5. Here, the process in FIG. 9 is controlled and executed by the CPU 2201 of the virtual printer 120.

In a step S9001, the CPU 2201 waits for reception of a command from the information processing apparatus 130, and upon receipt of the command, the CPU 2201 proceeds to the next step S9002.

In the step S9002, the CPU 2201 interprets the command received from the information processing apparatus 130 and determines whether or not the command is a prohibited settings information acquisition request. If it is determined that the command is a prohibited settings information acquisition request, the CPU 2201 proceeds to a step S9003, whereas if it is determined that the command is another command, the CPU 2201 proceeds to a step S9005. In the step S9005, the CPU 2201 performs processing associated with the other command, followed by terminating the present process.

In the step S9003, the CPU 2201 reads out the prohibited settings information registered and stored in the step S8005.

In a step S9004, the CPU 2201 transmits the prohibited settings information read in the step S9003 to the information processing apparatus 130, followed by terminating the present process.

FIG. 10Aa to 10Eb show examples of a message of IPP communication, exchanged between the printer 110, the virtual printer 120, and the information processing apparatus 130.

A message 1010 shown in FIG. 10Aa is an example of a message of the registration request (Register-Output Device) transmitted from the printer 110 to the virtual printer 120. The message 1010 is transmitted e.g. in the step S4002.

The message 1010 is formed by header information of an HTTP layer and IPP message data 1011 of HTTP. Description of "ipp://XXXX.local.:631/ipp/print" in the IPP message data 1011 is an identifier indicative of one of the printers 110a, 110b, and 110c. The virtual printer 120 transmits the capabilities information acquisition request in the step S4003 to one of the printers 110a, 110b, and 110c, to which the identifier in the IPP message data 1011 applies, and notifies the printer of a result of the registration process in the step S4013.

A message 1020 shown in FIG. 10Ab is an example of a message notifying the printer 110 of a result of the registration process (Register-Output-Device Response) from the virtual printer 120. The message 1020 is transmitted e.g. in the step S4013.

The message 1020 is an example of a message transmitted to the printer 110 when the virtual printer 120 permits registration of the printer 110. Description of "status-code: Successful (successful-ok)" in IP message data 1021 in the message 1020 shows an attribute indicating that registration is permitted.

A message 1030 shown in FIG. 10Ba is an example of a message of the capabilities information request (Get-Printer-Attributes Request) transmitted from the virtual printer 120 to the printer 110. The message 1030 is transmitted e.g. in the step S4003.

IPP message data 1031 in the message 1030 includes attributes 1031a to 1031d each indicative of a type of capability to be inquired to the printer 110.

More specifically, the attribute 1031a is an attribute for inquiring about whether or not color printing is supported as a print mode, and the attribute 1031b is an attribute for inquiring about whether or not finishing is supported. Further, the attribute 1031c is an attribute for inquiring about whether or not double-sided printing is supported, and the attribute 1031d is an attribute for inquiring about supported sheet types.

Messages 1040 and 1050 shown in FIGS. 10Bb and 10Bc, respectively, are examples of a message of the capabilities information (Get-Printer-Attributes Response) transmitted from the printer 110, as a response to the request in the message 1030 from the virtual printer 120. The messages 1040 and 1050 are transmitted e.g. in the step S4004.

IPP message data 1041 in the message 1040 includes attributes 1041a to 1041d each indicative of a capability supported by the printer 110a.

More specifically, the attribute 1041a is an attribute indicating that monochrome is supported as a color setting, and the attribute 1041b is an attribute indicating that stapling and punching are supported as finishing settings.

Further, the attribute 1041c is an attribute indicating that long-side binding and short-side binding are supported as double-sided print settings, and the attribute 1041d is an attribute indicating that A4, LETTER, LEGAL, A3, and LEDGER are supported as sheet size settings.

IPP message data 1051 in the message 1050 includes attributes 1051a to 1051d each indicative of a capability supported by the printer 110b.

More specifically, the attribute 1051a is an attribute indicating that color is supported as a color setting, and the attribute 1051b is an attribute indicating that no finishing settings are supported. Further, the attribute 1051c is an attribute indicating that no double-sided print settings are supported, and the attribute 1051d is an attribute indicating that A4, LETTER, and LEGAL are supported as sheet size settings.

A message 1060 shown in FIG. 10Ca is an example of a message of a request for the logical product information of the printer capabilities (Get-Printer-Attributes Request), which is transmitted from the information processing apparatus 130 to the virtual printer 120. The message 1060 is transmitted e.g. in the step S5002.

IPP message data 1061 in the message 1060 indicates an attribute indicative of an inquiry about the capabilities supported by all of the printers registered in the virtual printer 120.

A message 1070 shown in FIG. 10Cb is an example of a message of the logical product information of the printer capabilities (Get-Printer-Attributes Response) transmitted from the virtual printer 120, as a response to the message 1060. The message 1070 is transmitted e.g. in the step S5004.

IPP message data 1071 in the message 1070 includes attributes 1071a to 1071d each indicative of a capability supported by all of the printers registered in the virtual printer 120.

More specifically, the attribute 1071a is an attribute indicating that monochrome is supported as a color setting, and the attribute 1071b is an attribute indicating that no finishing settings are supported. The attribute 1071c is an attribute indicating that no double-sided print settings are supported, and the attribute 1071d is an attribute indicating that A4, LETTER, and LEGAL are supported as sheet size settings.

A message 1080 shown in FIG. 10Da is an example of a message of a request for the logical sum information of the printer capabilities (Get-Printer-Attributes Request), transmitted from the information processing apparatus 130 to the virtual printer 120. The message 1080 is transmitted e.g. in the step S5006.

IPP message data 1081 in the message 1080 indicates an attribute indicating that the message is an inquiry about the capabilities supported by one of the printers registered in the virtual printer 120.

A message 1090 shown in FIG. 10Db is an example of a message of the logical sum information of the printer capabilities (Get-Printer-Attributes Response) transmitted from the virtual printer 120, as a response to the message 1080. The message 1090 is transmitted e.g. in the step S5008.

IPP message data 1091 in the message 1090 includes attributes 1091a to 1091d each indicative of a capability supported by one of the printers registered in the virtual printer 120.

More specifically, the attribute 1091a is an attribute indicating that color is supported as a color setting, and the attribute 1091b is an attribute indicating that stapling and punching are supported as finishing settings. The attribute 1091c is an attribute indicating that long-side binding and short-side binding are supported as double-sided print settings, and the attribute 1091d is an attribute indicating that A4, LETTER, LEGAL, A3, and LEDGER are supported as sheet size settings.

A message 1092 shown in FIG. 10Ea is an example of a message of a request for the prohibited settings information of the printers (Get-Printer-Attributes Request), transmitted from the information processing apparatus 130 to the virtual printer 120. The message 1092 is transmitted e.g. in the step S5009.

IPP message data 1093 in the message 1092 indicates an attribute indicating that the message is an inquiry about combinations of print settings supported by none of the printers 110 registered in the virtual printer 120.

A message 1094 shown in FIG. 10Eb is an example of a message of the prohibited settings information of the printers (Get-Printer-Attributes Response) transmitted from the virtual printer 120, as a response to the message 1092. The message 1094 is transmitted e.g. in the step S5011.

IPP message data 1095 in the message 1094 includes attributes 1095a and 1095b each indicative of a combination of print settings supported by none of the printers 110 registered in the virtual printer 120.

More specifically, the attribute 1095a is an attribute indicative of a combination of print settings: a color print setting and a sheet size setting of A3, and a combination of print settings: the color print setting and a sheet size setting of LEDGER. The attribute 1095b is an attribute indicative of a combination of print settings: the color print setting and a finishing setting of stapling, and a combination of print settings: the color print setting and a finishing setting of punching.

Figure 11A:
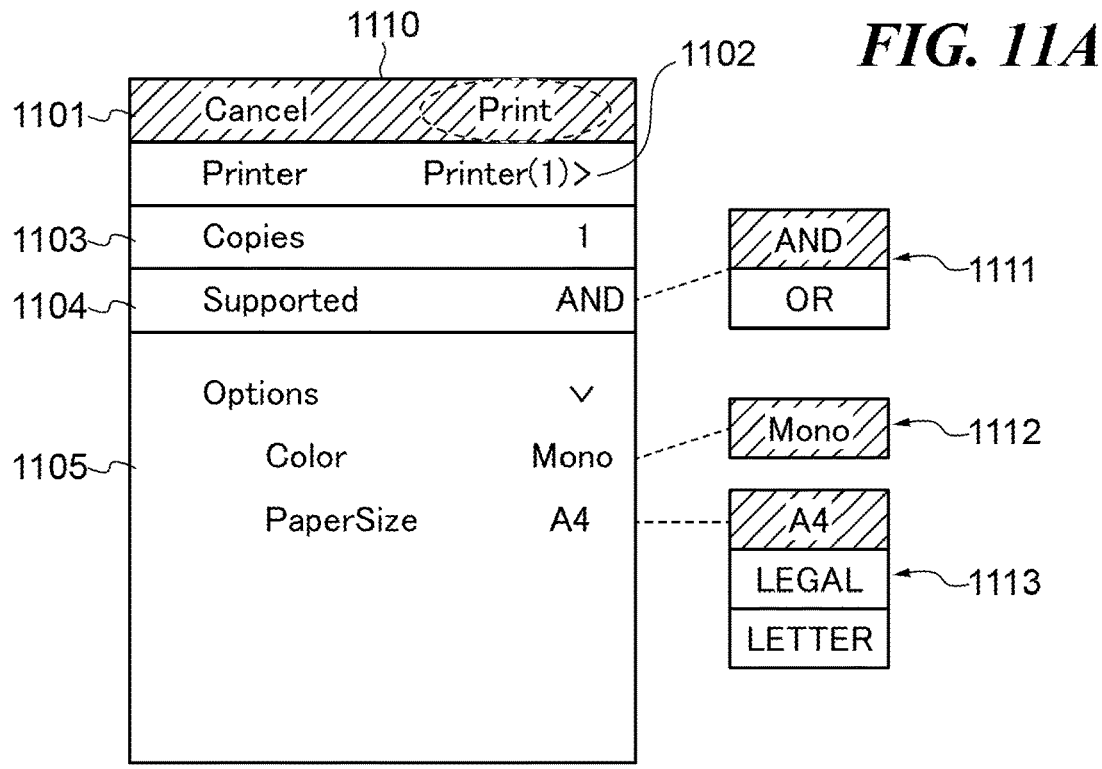
FIGS. 11A and 11B are views each showing an example of a print settings screen displayed on the information processing apparatus.
Figure 11B:
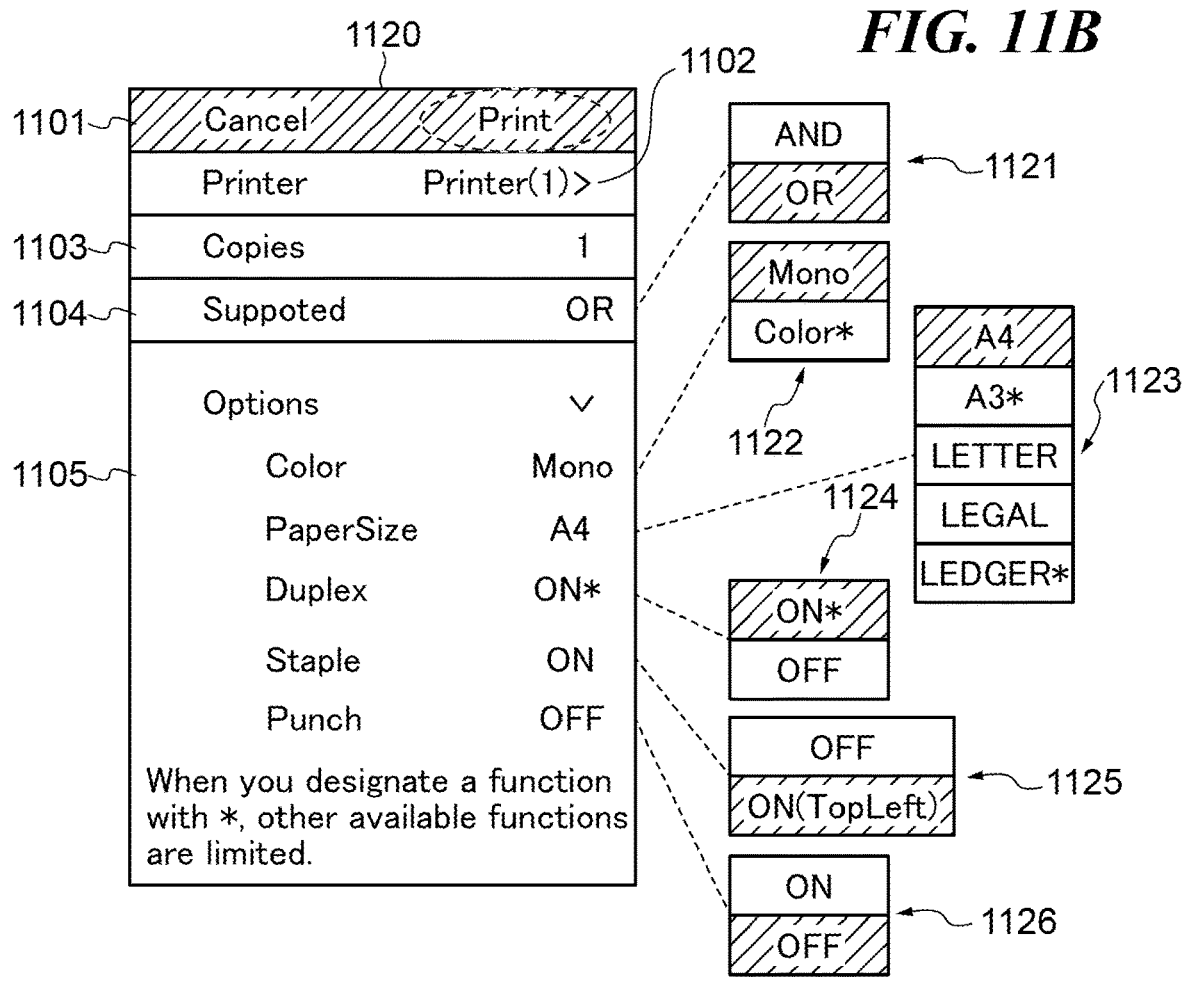

Next, FIGS. 11A and 11B show examples of the print settings screen displayed on the touch panel 2306 of the information processing apparatus 130 in the step S5013.

UI screens 1110 and 1120, shown in FIGS. 11A and 11B, respectively, are print settings screens used in a case where the smartphone 130b or the tablet 130a is used as the information processing apparatus 130. FIGS. 11A and 11B show the print settings screen in a case where the printers 110a and 110b have already been registered under the control of the virtual printer 120, by way of example. The UI screens 1110 and 1120 are each comprised of a status selection section 1101, a printer selection section 1102, a number-of-copies setting section 1103, a print support selection section 1104, and an option setting section 1105 which displays selection items.

As displayed on the UI screens 1110 and 1120, in a case where Printer (1) is selected by a user on the printer selection section 1102, printer functions provided to the information processing apparatus 130 by the virtual printer 120 are displayed in an abstracted state.

Further, as displayed on the UI screen 1110, in a case where AND (logical product) is selected from selectable items, as denoted by reference numeral 1111, on the print support selection section 1104 by the user, there is displayed a screen for setting functions which can be set to all of the printers registered in the virtual printer 120. On the other hand, as displayed on the UI screen 1120, in a case where OR (logical sum) is selected from the selectable items, as denoted by reference numeral 1121, on the print support selection section 1104, there is displayed a screen for setting functions which can be set to at least one of the printers registered in the virtual printer 120.

Although on the UI screen 1110, the user can set a desired number of copies on the number-of-copies setting section 1103, only the two items of a color setting item 1112 and a sheet size-setting item 1113 are displayed as the selection items of the option setting section 1105. Here, only monochrome can be selected by the user for the color setting item 1112, and one of A4, LEGAL, and LETTER can be selected by the user for the sheet size-setting item 1113.

On the other hand, on the UI screen 1120, the user can set a desired number of copies on the number-of-copies setting section 1103. Further, as the selection items of the option setting section 1105, a color setting item 1122, a sheet size-setting item 1123, a double-sided-print (Duplex) setting item 1124, a stapling setting item 1125, and a punching setting item 1126 are displayed. Here, the user can select one of monochrome and color for the color setting item 1122, and select one of A4, A3, LETTER, LEGAL, and LEDGER for the sheet size-setting item 1123. Further, the user can select one of ON and OFF for each of the double-sided-print setting item 1124, the stapling setting item 1125, and the punching setting item 1126. However, in a case where ON is selected on the double-sided-print setting item 1124, the settings are fixed to OFF for the stapling setting item 1125 and the punching setting item 1126, and are prevented from being changed.

Further, the prohibited settings corresponding to the prohibited settings information, described hereinafter with reference to FIG. 12, are reflected on the selection items of the option setting section 1105 on the UI screen 1120. For example, in FIG. 12, even when the double-sided print setting is set either to long-side binding or to short-side binding, the double-sided print setting is a prohibited setting conflicting with the color setting of color. Therefore, in a case where ON is selected for the double-sided-print setting item 1124 on the UI screen 1120, the color setting item 1122 is displayed in a state in which the monochrome printing (Mono) is selected and the color printing (Color) is grayed-out, and the setting is prevented from being changed.

Further, as shown in FIG. 11B, a mark "*" is added to a setting which is related to the prohibited settings information and can undesirably constrain other print settings. This makes it possible to notify, in a case where a setting with the mark "*" is selected, a user that there can be a constraint on a subsequent operation for selecting other selection items on the option setting section 1105.

FIG. 12 is a diagram showing an example of a prohibited settings information management table, updated and stored in the virtual printer 120 in the step S4012 in FIG. 4. The table shown in FIG. 12 is the prohibited settings information management table showing, by way of example, a case where the printers 110a and 110b have already been registered under the control of the virtual printer 120, and shows combinations of print settings which turn out to be prohibited settings in contrast to the print settings, shown in FIGS. 6A and 6B, with which printing is executable. Note that the printer 110c has not been registered under the control of the virtual printer 120 in the example shown in FIG. 12.

Prohibited settings information 1201 indicates that a combination of the color setting of color and the sheet size setting of A3 are prohibited settings, and prohibited settings information 1202 indicates that a combination of the color setting of color and the sheet size setting of LEDGER are prohibited settings. Further, prohibited settings information 1203 indicates that a combination of the color setting of color and the double-sided print setting of long-side binding are prohibited settings, and prohibited settings information 1204 indicates that a combination of the color setting of color and the double-sided print setting of short-side binding are prohibited settings.

Next, a description will be given of a second embodiment of the present invention. In the first embodiment, the description is given of the case where, to generate the prohibited settings information of the virtual printer when additionally registering a printer, executability of printing with each of all combinations of the logical sum functions is inquired to all printers using a diallel method. On the other hand, in the second embodiment, control for reducing the number of times of inquiries to the printers is added to the control performed in the first embodiment. Further, a method for efficiently updating the capabilities information in a case where a registered printer is deleted will be described in the present embodiment. Note that the hardware configuration in the second embodiment is the same as that described in the first embodiment, and hence description thereof is omitted.

Figure 13:
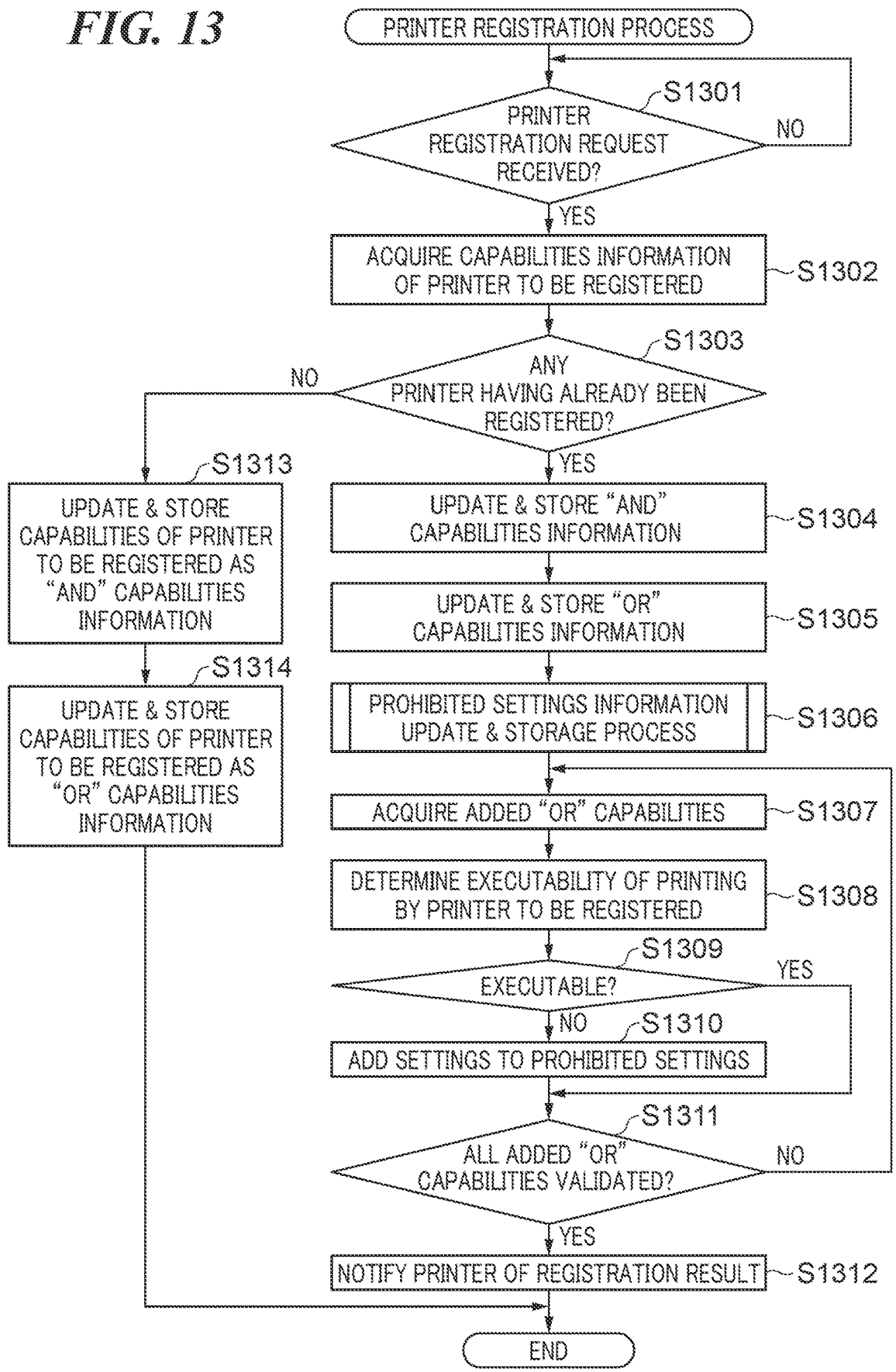
FIG. 13 is a flowchart of a printer registration process performed by a virtual printer of a print service system according to a second embodiment of the present invention.

Here, for explanation of the registration process, the description is given of a case where the printers 110a and 110b have already been registered under the control of the virtual printer 120 and the printer 110c is further registered under the control of the same. FIG. 13 is a flowchart of the printer registration process according to the present embodiment from the step in which the virtual printer 120 receives a registration request from the printer 110c (step S4002) to the step in which the virtual printer 120 notifies the printer 110c of a registration result (step S4013) in the registration process described with reference to FIG. 4. Here, the process in FIG. 13 is controlled and executed by the CPU 2201 of the virtual printer 120.

In a step S1301, upon receipt of a printer registration request from the printer 110c, the CPU 2201 of the virtual printer 120 proceeds to a step S1302, wherein the CPU 2201 transmits a capabilities information request to the printer 110c and acquires the capabilities information from the printer 110c as a response to the request. Further, the CPU 2201 newly registers the acquired capabilities information of the printer 110c in the virtual printer 120 and stores the same in the storage 2204.

In a step S1303, the CPU 2201 determines whether or not there is any other printer which has already been registered in the virtual printer 120. If there is any other registered printer, the CPU 2201 proceeds to a step S1304. If there is no other registered printer, the CPU 2201 proceeds to a step S1313. In the step S1313, the CPU 2201 stores the capabilities of the printer 110c, acquired in the step S1302, as the logical product information of the capabilities (the AND capabilities), and updates the logical product information. Next, in a step S1314, the CPU 2201 stores the capabilities of the printer 110c, acquired in the step S1302, as the logical sum information of the capabilities (the OR capabilities), and updates the logical sum information, followed by terminating the present process.

On the other hand, in the step S1304, the CPU 2201 updates the logical product information of the capabilities (the AND capabilities) of the printers 110 registered in the virtual printer 120, and stores the updated information in the storage 2204.

In a step S1305, the CPU 2201 updates the logical sum information of the capabilities (the OR capabilities) of the printers 110 registered in the virtual printer 120, and stores the updated information in the storage 2204. Note that the logical sum information of the capabilities (the OR capabilities) of the registered printers 110 before the update is referred to in a step S1307, and hence the information before the update is stored in the RAM 2202.

In a step S1306, the CPU 2201 performs a prohibited settings information update and storage process for updating the prohibited settings information of the printers 110 registered in the virtual printer 120 and storing the updated information in the storage 2204. Details of this process will be described with reference to FIG. 14.

In the step S1307, the CPU 2201 compares the logical sum information of the capabilities (the OR capabilities) of the registered printers 110, updated in the step S1305, and the logical sum information of the capabilities (the OR capabilities) of the registered printers 110 before the update, stored in the RAM 2202. Next, the CPU 2201 acquires logical sum information of the capabilities (the OR capabilities), which was added in the step S1305, from a result of the comparison. Further, based on the acquired logical sum information of the capabilities (the OR capabilities), the CPU 2201 determines a combination of print settings, about which the printer 110c is to be inquired whether printing is executable therewith (validation request).

Here, for convenience of explanation, an example of the update process in a case where a request for further adding the printer 110c is received in a state in which the printers 110a and 110b have been registered in advance will be described. FIGS. 18A to 18C are tables useful in explaining examples of the prohibited settings information update and storage process in FIG. 14.

Referring to FIG. 18A, a table 1801 shows a table corresponding to the logical sum information of the capabilities (the OR capabilities) before updating the information in the step S1305, in a state in which the printers 110a and 110b have already been registered. Boxes formed by the crossing of a column and a row each represent a combination of print settings associated with respective functions, and a mark "o" indicates that printing with the combination of print settings is executable, and a mark "x" indicates that the combination of print settings conflict with each other. In this table, "color" indicates color as a color setting, "monochrome" indicates monochrome as a color setting, "A4" and "A3" indicate print settings corresponding to A4 and A3 as sheet size settings, respectively. Further, "double-sided" indicates long-side binding and short-side binding as the double-sided print settings, and "stapling" and "punching" indicate print settings corresponding to stapling and punching as finishing settings, respectively.

Referring to FIG. 18B, a table 1802 shows a table corresponding to the logical sum information of the capabilities (the OR capabilities) after updating the information in the step S1305 in a state in which the printer 110c has been additionally registered. The printer 110c has the capabilities of stapling and punching as the finishing function, which are not included in the table 1801, and hence stapling and punching are added based on the capabilities information acquired in the step S1302. However, the prohibited settings of combinations of stapling and other functions and combinations of punching and other functions are unknown at the time of update of the information in the step S1305.

Referring to FIG. 18C, a table 1803 shows a table corresponding to the logical sum information of the capabilities (the OR capabilities) after the process proceeds to a step S1312, described hereinafter. In the table 1803, a result of determination, in the prohibited settings information update and storage process in FIG. 14, as to whether or not combinations of print settings with which printing is inexecutable before registering the printer 110c, becomes executable by additionally registering the capabilities of the printer 110c, is reflected. More specifically, out of the respective combinations of "color" and "A3", "color" and "double-sided", and "A3" and "double-sided", the combination of "color" and "double-sided" with which printing is executable by the printer 110c is deleted from the prohibited settings information. Further, by executing steps S1405 and S1407, described hereinafter, whether each of stapling and punching, added by the capabilities of the printer 110c, can be used in combination with the other functions, are made clear as the illustrated combinations of print settings.

Referring again to FIG. 13, in a step S1308, the CPU 2201 transmits a validation request to the printer 110c based on the interpretation result, for requesting the printer 110c to validate whether or not printing with the combination of print settings determined in the step S1307 is executable.

In a step S1309, upon receipt of a result of the validation from the printer 110c as a response to the validation request transmitted in the step S1308, the CPU 2201 interprets the received validation result. Then, the CPU 2201 determines whether or not printing with the combination of print settings determined in the step S1307 is executable by the printer 110c. If it is determined that printing with the combination of print settings is executable, the CPU 2201 directly proceeds to a step S1311. If it is determined that printing is inexecutable, the CPU 2201 proceeds to a step S1310.

In the step S1310, the CPU 2201 stores and registers the combination of print settings determined in the step S1307 in the storage 2204 as prohibited settings information associated with a job to be input to the virtual printer 120.

In the step S1311, the CPU 2201 determines whether or not transmission of the validation request is completed for all of the combinations of print settings (the OR capabilities), which can be determined based on the logical sum information of the capabilities added in the step S1305. If it is determined that transmission of the validation request is completed, the CPU 2201 proceeds to the step S1312. If it is determined that transmission of the validation request is not completed, the CPU 2201 returns to the step S1307, and determines, out of all combinations of print settings, which can be determined based on the logical sum information of the capabilities added in the step S1305, one combination of print settings for which the validation request has not been transmitted yet, as one on which validation is to be performed.

In the step S1312, the CPU 2201 notifies the printer 110c of a result of registration of the printer 110c, followed by terminating the present process.

Figure 14:
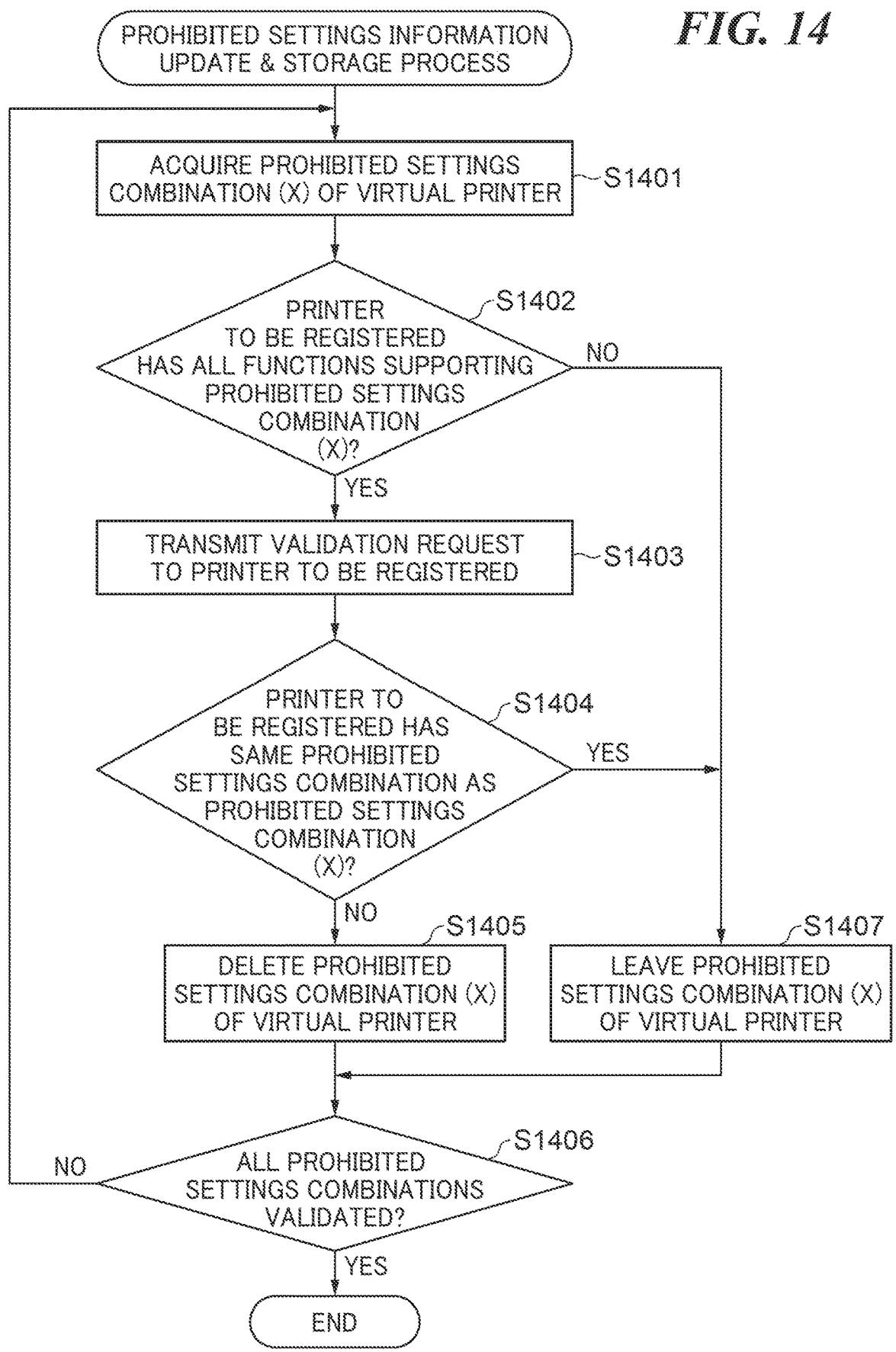
FIG. 14 is a flowchart of a prohibited settings information update and storage process performed by the virtual printer of the print service system according to the second embodiment.

Next, the prohibited settings information update and storage process according to the second embodiment, which is executed in the step S1306 in FIG. 13, will be described with reference to a flowchart in FIG. 14. Here, the process in FIG. 14 is controlled and executed by the CPU 2201 of the virtual printer 120.

In a step S1401, the CPU 2201 determines, from the prohibited settings information of the virtual printer 120, a combination of print settings (prohibited settings combination (X)) based on which whether to update the prohibited settings information is determined in a step S1402 et seq.

In the step S1402, the CPU 2201 determines whether or not the printer 110c to be registered has all functions supporting the print settings of which the combination is determined in the step S1401. For example, in a case where the prohibited settings information 1201 shown in FIG. 12 has been stored, the CPU 2201 determines whether or not the printer 110c has both of the functions of "color" and "A3". If it is determined that the printer 110c has all of the functions supporting the print settings of which the combination is determined in the step S1401, the CPU 2201 proceeds to a step S1403. If it is determined that the printer 110c does not have all of the functions supporting the print settings of which the combination is determined in the step S1401, the CPU 2201 proceeds to the step S1407.

Next, in the step S1403, the CPU 2201 transmits a validation request to the printer 110c to be registered, for requesting the printer 110c to validate whether or not printing with the combination of print settings determined in the step S1401 is executable.

In a step S1404, upon receipt of a result of the validation from the printer 110c as a response to the validation request transmitted in the step S1403, the CPU 2201 interprets the received validation result. Then, the CPU 2201 determines whether or not printing with the combination of print settings, determined in the step S1401, is inexecutable by the printer 110c, i.e. whether or not the printer 110c as a printer to be registered has the same prohibited settings combination as the prohibited settings combination (X), based on the interpretation result. If it is determined that printing with the combination of print settings is executable, i.e. if it is determined the printer 110c does not have the same prohibited settings combination, the CPU 2201 proceeds to a step S1405. On the other hand, if it is determined that printing with the combination of print settings is inexecutable, i.e. if it is determined the printer 110c has the same prohibited settings combination, the CPU 2201 proceeds to the step S1407.

In the step S1407, the CPU 2201 leaves the combination of print settings (prohibited settings combination (X)), determined in the step S1401, as the prohibited settings information of the print settings of the virtual printer 120.

In the step S1405, the CPU 2201 deletes the combination of print settings (prohibited settings combination (X)), determined in the step S1401, from the prohibited settings information of the print settings of the virtual printer 120.

In a step S1406, the CPU 2201 determines whether or not the update determination of the prohibited settings is completed for all of the combinations of print settings, set as the prohibited settings of the virtual printer 120. If it is determined that the update determination of the prohibited settings is completed, the CPU 2201 terminates the present process. If it is determined that the update determination of the prohibited settings is not completed, the CPU 2201 returns to the step S1401, and determines one combination of print settings out of all of the combinations of print settings set as the prohibited settings of the virtual printer 120, on which update determination of the prohibited settings has not been performed yet, as one to be subjected to the determination.

Note that although in the present embodiment, validation is sequentially requested in the step S1308 with respect to each of all the combinations of print settings acquired in the step S1307, this is not limitative. For example, validation may be requested in the step S1308 with respect only to print settings which do not correspond to the prohibited settings included in the prohibited settings information obtained after completion of the process in FIG. 14, but are included in the combinations of print settings, acquired in the step S1307.

Next, a description will be given of a sequence of operations performed between the virtual printer 120 and the printer 110 when a printer 110 having its capabilities information registered in the virtual printer 120 is deleted from the virtual printer 120 in the second embodiment with reference to FIG. 15. The following description is given of a case where, in a state in which the printers 110a, 110b, and 110c have the capabilities information sets registered in the virtual printer 120 before starting the present process, the capabilities information of the printer 110a is deleted from the virtual printer 120, by way of example.

Figure 15:
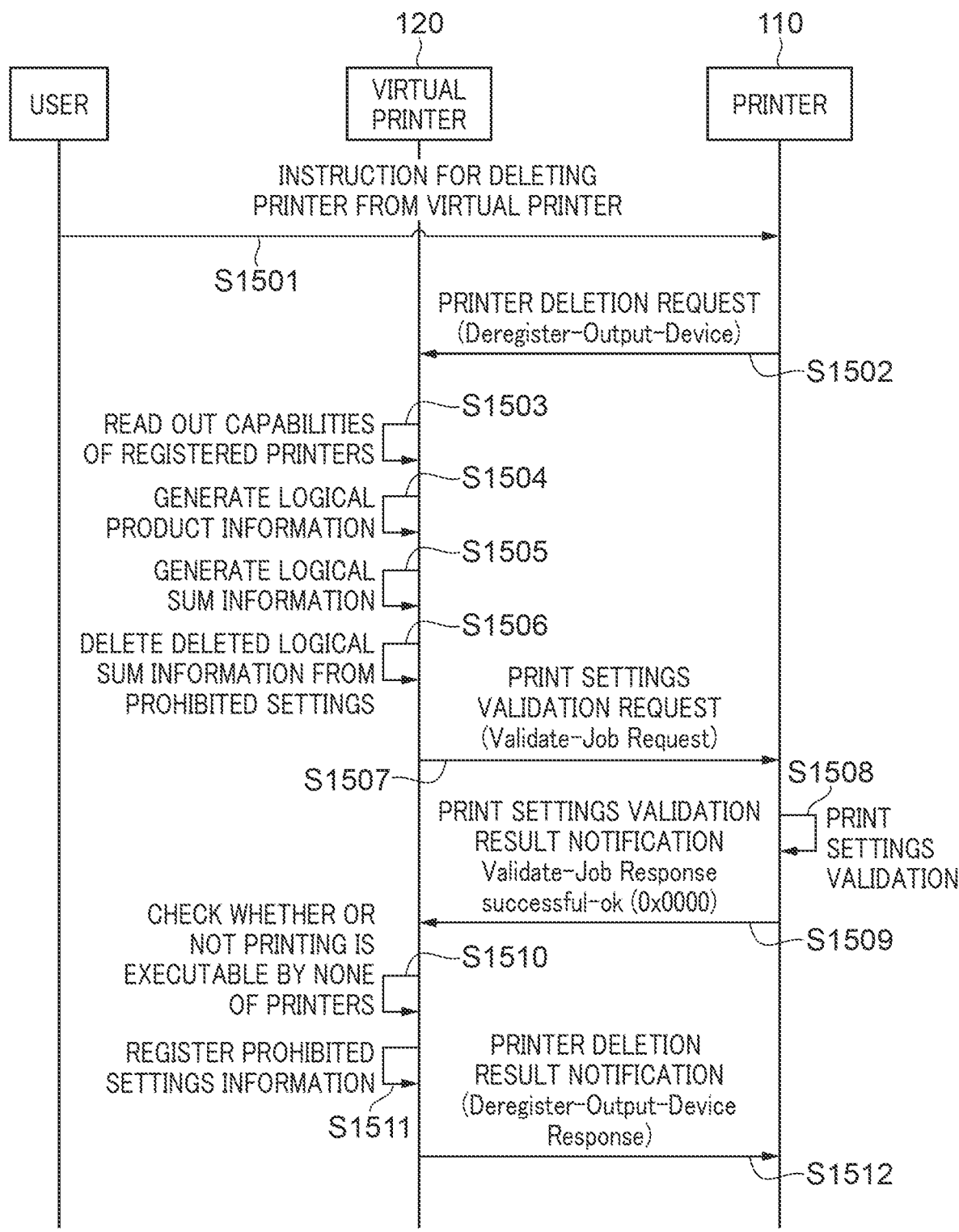
FIG. 15 is a sequence diagram of operations performed between the virtual printer and a printer of the print service system according to the second embodiment in a case where registration of a printer is deleted from the virtual printer.

Referring to FIG. 15, first, in a step S1501, upon receipt of an instruction for deleting the printer 110a from the virtual printer 120 from a user via the console panel 2107, the printer 110a proceeds to a step S1502.

In the step S1502, the printer 110a transmits a printer registration deletion request (Deregister-Output-Device) to the virtual printer 120 by IPP communication.

In a step S1503, upon receipt of the registration deletion request, the virtual printer 120 deletes the printer 110a from the registration. Further, the virtual printer 120 reads out the capabilities information sets of the printers 110b and 110c, which have already been registered in the virtual printer 120 other than the printer 110a before starting the present process, and the prohibited settings information indicative of combinations of print settings with which printing is inexecutable by the printers 110b and 110c.

In a step S1504, the virtual printer 120 generates and stores logical product information indicative of capabilities which all the printers registered in the virtual printer 120 have for processing. More specifically, the logical product information is generated from the capabilities information sets of the printers 110b and 110c, read in the step S1503.

In a step S1505, the virtual printer 120 generates and stores logical sum information indicative of capabilities which any one of the printers registered in the virtual printer 120 has for processing. Similar to the logical product information, more specifically, from the capabilities information sets of the printers 110b and 110c, read in the step S1503, the logical sum information is generated.

In a step S1506, the virtual printer 120 compares the logical sum information generated in the step S1505, and the original logical sum information which was generated and stored based on the capabilities information sets of the printers 110a, 110b and 110c before registration of the printer 110a is deleted by the present process. Next, the virtual printer 120 extracts logical sum information deleted from the original logical sum information, based on a result of the comparison. If any combination of print settings of the deleted logical sum information is included in the prohibited settings of the print settings of the virtual printer 120, the virtual printer 120 deletes the combination of print settings from the prohibited settings. Further, the virtual printer 120 generates combinations of print settings, which do not correspond to the prohibited settings after the deletion, and are included in the logical sum information generated in the step S1505.

In a step S1507, the virtual printer 120 transmits a validation request for requesting all the printers remaining registered to validate whether or not printing with the combinations of print settings, generated in the step S1506, are executable (Validate-Job Request) to all the printers by IPP communication. That is, this validation request is transmitted to each of the registered printers 110b and 110c other than the printer 110a deleted from the registration.

In a step S1508, the printer 110b validates whether or not printing with the combination of print settings is executable thereby, in response to the validation request (Validate-Job Request), transmitted from the virtual printer 120 in the step S1507. Similarly, the printer 110c also validates whether or not printing with the combination of print settings is executable thereby in response to the validation request transmitted from the virtual printer 120 in the step S1507.

In a step S1509, the printer 110b transmits a result of the validation (Validate-Job Response) by IPP communication as a response to the print settings validation request received in the step S1507. Note that as mentioned in the step S1508, since the printer 110c also performs the same validation in response to the print settings validation request received in the step S1507, the validation result is also transmitted from the printer 110c.

In a step S1510, the virtual printer 120 determines whether or not the combinations of print settings, generated in the step S1506, has turned out to be prohibited settings, based on the validation results received from the printers 110b and 110c in the step S1509. That is, the virtual printer 120 checks whether or not each combination of print settings, generated in the step S1506, is information indicative of the print settings with which printing is executable by neither the printer 110b nor 110c remaining registered.

In a step S1511, if it is determined that any combination of print settings, generated in the step S1506, has turned out to be prohibited settings based on a result of the check in the step S1510, the virtual printer 120 registers the combination (s) of print settings as the prohibited settings information (prohibited settings combinations) of the print settings of the virtual printer 120.

In a step S1512, the virtual printer 120 notifies the printer 110a of a result of the process for deleting the printer 110a from registration (Deregister-Output-Device Response) by IPP communication. The printer 110a displays the notified contents on the console panel 2107 to thereby notify the user of completion of deletion of the printer 110a from registration in the virtual printer 120. Then, the present process is terminated.

Figure 16:
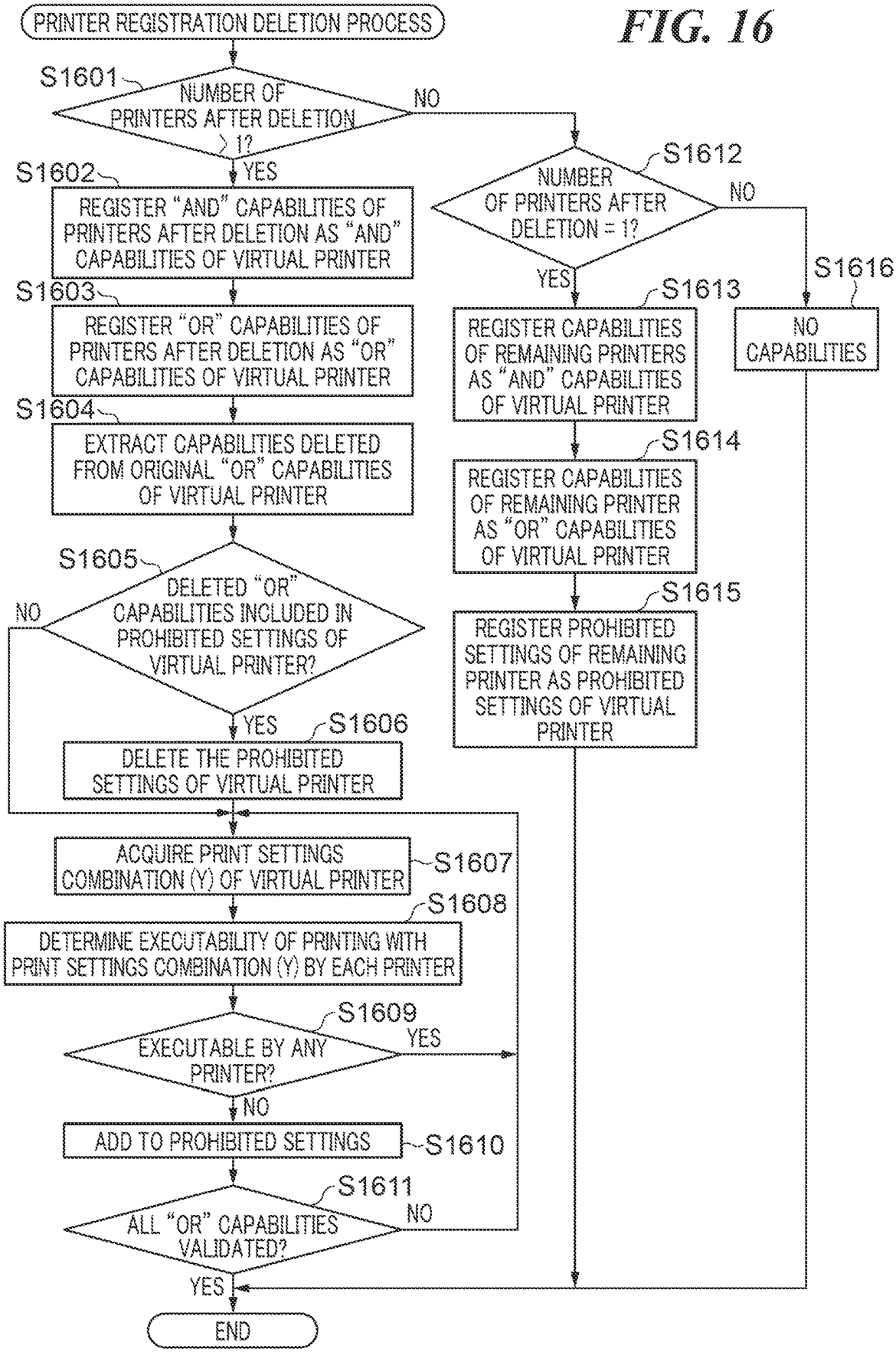
FIG. 16 is a flowchart of a printer registration deletion process performed by the virtual printer of the print service system according to the second embodiment.

Next, a description will be given of a process from the step in which the virtual printer 120 receives a registration deletion request from the printer 110a (step S1502) to the step in which the virtual printer 120 notifies the printer 110a of the processing result (step S1512) in the registration deletion process in FIG. 15 with reference to FIG. 16. That is, a printer registration deletion process according to the present embodiment will be described. Here, the process in FIG. 16 is controlled and executed by the CPU 2201 of the virtual printer 120.

In a step S1601, the CPU 2201 determines whether or not the number of printers remaining registered after the printer 110a having transmitted the registration deletion request has been deleted from the registration in the virtual printer 120 is larger than one. If it is determined that the number of the registered printers is larger than one, the CPU 2201 proceeds to a step S1602, whereas if it is determined that the number of the registered printers is not larger than one, the CPU 2201 proceeds to a step S1612.

In the step S1602, the CPU 2201 updates the logical product information of the capabilities (the AND capabilities) based on the capabilities of the plurality of printers 110 remaining registered after the printer 110a has been deleted from the registration, and stores the updated information in the storage 2204.

In a step S1603, the CPU 2201 updates the logical sum information of the capabilities (the OR capabilities) based on the capabilities of the plurality of printers 110 remaining registered after the printer 110a has been deleted from the registration, and stores the updated information in the storage 2204. Note that the logical sum information of the capabilities (the OR capabilities) of the printers 110 registered before the update is to be referred to in a step S1604, and hence this information is stored in the RAM 2202.

In the step S1604, the CPU 2201 compares the logical sum information of the capabilities (the OR capabilities), updated in the step S1603, and the logical sum information of the capabilities (the OR capabilities) before the update, stored in the RAM 2202, and extracts combinations of print settings, deleted from the original logical sum information of the capabilities (the OR capabilities).

In a step S1605, the CPU 2201 determines whether or not any combination of print settings extracted in the step S1604 is included in the prohibited settings information of the print settings of the virtual printer 120. If it is determined that there is any combination of print settings is included, the CPU 2201 proceeds to a step S1606, whereas if not, the CPU 2201 proceeds to a step S1607.

In the step S1606, if it is determined in the step S1605 that any combination of print settings is included in the prohibited settings information of the print settings of the virtual printer 120, the CPU 2201 deletes the combination of print settings from the prohibited settings information of the print settings of the virtual printer 120.

In the step S1607, the CPU 2201 determines one (print settings combination (Y)) of combinations of print settings generated from the logical sum information of the capabilities updated in the step S1603, on which validation is to be requested in a step S1608, described hereinafter.

In the step S1608, the CPU 2201 transmits a validation request to all of the printers 110 remaining registered in the virtual printer 120 (the printers 110b and 110c in the present example), for requesting them to validate whether or not printing with the print settings combination (Y) determined in the step S1607 is executable by the printer 110.

In a step S1609, upon receipt of a result of the validation from each of the printers 110b and 110c as a response to the validation request transmitted in the step S1608, the CPU 2201 interprets the received validation results. Then, the CPU 2201 determines whether or not printing with the print settings combination (Y) determined in the step S1607 is executable by any of the printers 110 remaining registered in the virtual printer 120, based on the interpreted results. If it is determined that printing is executable by neither the printers 110b nor 110c, the CPU 2201 proceeds to a step S1610. On the other hand, if it is determined that printing is executable by at least one of the printers 110 remaining registered in the virtual printer 120, the CPU 2201 returns to the step S1607. That is, the CPU 2201 determines one of the combinations of print settings, on which the validation has not been requested yet, as a print settings combination about which each printer 110 registered in the virtual printer 120 is to be inquired whether printing is executable therewith (validation request) in the step S1608, and continues the present process.

In the step S1610, the CPU 2201 additionally stores and registers the print settings combination determined in the step S1607, in the storage 2204, as prohibited settings information of the print settings of the virtual printer 120.

In a step S1611, the CPU 2201 determines whether or not the validation in the step S1608 has been performed for all of the combinations of print settings generated from the logical sum information of the capabilities updated in the step S1603. If it is determined that the validation is completed, the present process is terminated. If it is determined that the validation is not completed, the CPU 2201 returns to the step S1607, and continues the present process.

On the other hand, in the step S1612, the CPU 2201 determines whether or not the number of printers 110 remaining registered after the printer 110a having transmitted the registration deletion request has been deleted from the registration is equal to one. If it is determined that one printer is remaining registered, the CPU 2201 proceeds to a step S1613, whereas if it is determined that no printer is remaining registered, the CPU 2201 proceeds to a step S1616.

In the step S1613, the CPU 2201 stores and registers the capabilities of the one printer 110 remaining registered in the storage 2204 as the logical product information of the capabilities (the AND capabilities) of the virtual printer 120.

In a step S1614, the CPU 2201 stores and registers the capabilities of the one printer 110 remaining registered in the storage 2204 as the logical sum information of the capabilities (the OR capabilities) of the virtual printer 120.

In a step S1615, the CPU 2201 stores and registers combinations of print settings, with which printing is inexecutable by the one printer 110 remaining registered, in the storage 2204, as the prohibited settings information of the print settings of the virtual printer 120, followed by terminating the present process.

In the step S1616, since no printer 110 is remaining registered in the virtual printer 120, the CPU 2201 updates the capabilities of the virtual printer 120 to "no printing capabilities". More specifically, the CPU 2201 registers information indicative of "no printing capabilities" in both of the logical product information of the capabilities (the AND capabilities) and the logical sum information of the capabilities (the OR capabilities) of the printer 120, followed by terminating the present process.

FIG. 17 shows an example of messages transmitted and received between the printer 110 and the virtual printer 120.

A message 1710 shown in FIG. 17A is an example of the message of the registration deletion request (Deregister-Output Device) transmitted from the printer 110 to the virtual printer 120. The message 1710 is transmitted e.g. in the step S1502.

The message 1710 is formed by header information of an HTTP layer and IPP message data 1711 of HTTP. Description of "ipp://XXXX.local.:631/ipp/print" in the IPP message data 1711 indicates an identifier identifying a printer of the printers 110a, 110b, and 110c, which has transmitted the registration deletion request. The virtual printer 120 transmits the print settings validation request in the step S1507 to printers other than the one of the printers 110a, 110b, and 110c registered in the virtual printer 120, which is identified by the identifier in the IPP message data 1711. Further, the virtual printer 120 notifies the printer identified by this identifier of a result of the registration deletion process in the step S1512.

A message 1720 shown in FIG. 17B is an example of the message of the notification of the result of the registration deletion process (Deregister-Output-Device Response) transmitted from the virtual printer 120 to the printer 110. The message 1720 is transmitted e.g. in the step S1512.

The message 1720 is an example of the message transmitted when the virtual printer 120 permits deletion of registration of the printer 110. Description of "status-code: Successful (successful-ok)" in IPP message data 1721 in the message 1720 shows an attribute indicating that deletion of registration is permitted.

Other Embodiments

Note that in the first embodiment, the description is given of the case where conflict resolution is performed by the information processing apparatus 130 by displaying the prohibited settings information indicative of combinations of print settings conflicting with each other between the printers 110a, 110b, and 110c, on the information processing apparatus 130. However, the present invention is not limited to this. For example, execution of the steps S5009 and S5010 may be omitted. In this case, in the validation process in the step S5016, validation is performed as to whether or not the print settings transmitted from the information processing apparatus 130 include any combination of print settings conflicting with each other between the printers 110a, 110b, and 110c.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-172539 filed Sep. 14, 2018, and No. 2019-024683 filed Feb. 14, 2019, which are hereby incorporated by reference herein in their entirety.

What is claimed is:

1. A server system comprising:
one or more processors configured to:
cause an information processing apparatus to display a print setting screen;
transmit print data to one of a plurality of printers based on at least one of print settings which are set via the print setting screen, wherein the print settings include a first print setting and a second print setting;
determine whether or not any one of the plurality of printers is capable of performing printing with a combination of the first print setting and the second print setting; and
control the information processing apparatus to disable a user's ability to set the combination of the first print setting and the second print setting via the print setting screen, in a case where it is determined that none of the plurality of printers is capable of performing printing with the combination of the first print setting and the second print setting.

2. The server system according to claim 1, further comprising a storage for storing print settings executable by any one of the plurality of printers, wherein the print settings include the first print setting and the second print setting,
wherein the server system transmits the stored print settings in the storage to display the stored print setting at the print setting screen.

3. The server system according to claim 2, wherein the one or more processors are further configured to:
making an inquiry to each of the plurality of printers whether or not printing is executable with the combination of the first print setting and the second print setting; and
determine whether or not any one of the plurality of printers is capable of performing printing with the combination of the first print setting and the second print setting based on a response to the inquiry from the each of the plurality of printers.

4. The server system according to claim 3, wherein the storage further stores a combination of print settings conflict with each other,
the one or more processors are further configured to store the combination of the first print setting and the second print setting as the combination of print settings conflict with each other, in a case where it is determined that none of the plurality of printers is capable of performing printing with combination of the first print setting and the second print setting based on the responses to the inquiries.

5. The server system according to claim 2, wherein the one or more processors are further configured to:
receive, from each of the plurality of printers, a request for registering printer information thereof;
acquire capabilities information from a printer, among the plurality of printers, from which the request has been received; and
store, in the storage, a print setting with which any one of the plurality of printers is capable of performing printing, based on the acquired capabilities information.

6. The server system according to claim 5, wherein the print setting, with which any one of the plurality of printers is capable of performing printing, is a logical sum of the acquired capabilities information from the plurality of printers.

7. The server system according to claim 2, wherein the one or more processors are further configured to:
control the information processing apparatus to enable a user to set the combination of the first print setting and the second print setting, in a case where it is determined that any one of the plurality of printers is capable of performing printing with the combination of the first print setting and the second print setting.

8. The server system according to claim 1, the one or more processors are further configured to:
inform, in a case where it is determined that none of the plurality of printers is capable of performing printing with the combination of the first print setting and the second print setting, the information processing apparatus of information that the combination of the first print setting and the second print setting cannot be set.

9. The server system according to claim 1, the one or more processors are further configured to determine whether or not any one of the plurality of printers is capable of performing printing with the combination of the first print setting and the second print setting before causing the information processing apparatus to display the print setting screen.

10. A control method for controlling a server system comprising:
causing an information processing apparatus to display a print setting screen;
transmitting print data to one of a plurality of printers based on at least one of print settings which are set via the print setting screen, wherein the print settings include a first print setting and a second print setting;

determining whether or not any one of the plurality of printers is capable of performing printing with a combination of the first print setting and the second print setting; and controlling the information processing apparatus to disable a user's ability to set the combination of the first print setting and the second print setting via the print setting screen, in a case where it is determined that none of the plurality of printers is capable of performing printing with the combination of the first print setting and the second print setting.

11. An information processing apparatus comprising:
one or more processors configured to:
receive, from a server system which transmits print data to any one of a plurality of printers, at least one of print settings to be displayed at a print setting screen of the information processing apparatus, wherein the print settings include a first print setting and a second print setting;

display the print setting screen based on the received at least one of print settings;

control the print setting screen so as to disable a user's ability to set a combination of the first print setting and the second print setting via the print setting screen, in a case where none of the plurality of printers is capable of performing printing with the combination of the first print setting and the second print setting; and transmit at least one of the print settings set via the print setting screen to the server system.

12. The information processing apparatus according to claim 11, wherein the one or more processors are further configured to:
control to display the print setting screen so as to enable a user to set the combination of the first print setting and the second print setting, in a case where any one of the plurality of printers is capable of performing printing with the combination of the first print setting and the second print setting.

13. The information processing apparatus according to claim 11, wherein the one or more processors are further configured to:
receive, from the server system, information that the combination of the first print setting and the second print setting cannot be set, in a case where none of the plurality of printers is capable of performing printing with the combination of the first print setting and the second print setting; and display the print setting screen based on the received information.

14. The information processing apparatus according to claim 13, wherein the one or more processors are further configured to:
notify a user that setting of the first print setting constrains setting of another print setting among the print settings.

* * * * *